(12) United States Patent
Masputra et al.

(10) Patent No.: US 11,829,303 B2
(45) Date of Patent: Nov. 28, 2023

(54) METHODS AND APPARATUS FOR DEVICE DRIVER OPERATION IN NON-KERNEL SPACE

(71) Applicant: Apple Inc., Cupertino, CA (US)

(72) Inventors: Cahya Adiansyah Masputra, San Jose, CA (US); Zeh-Chen Liu, Cupertino, CA (US); Wei Shen, Cupertino, CA (US)

(73) Assignee: Apple Inc., Cupertino, CA (US)

(*) Notice: Subject to any disclaimer, the term of this patent is extended or adjusted under 35 U.S.C. 154(b) by 261 days.

(21) Appl. No.: 16/936,143

(22) Filed: Jul. 22, 2020

(65) Prior Publication Data

US 2021/0097006 A1    Apr. 1, 2021

Related U.S. Application Data

(60) Provisional application No. 62/906,657, filed on Sep. 26, 2019.

(51) Int. Cl.
*G06F 12/14* (2006.01)
*G06F 9/50* (2006.01)

(52) U.S. Cl.
CPC ........ *G06F 12/1458* (2013.01); *G06F 9/5016* (2013.01); *G06F 9/5022* (2013.01)

(58) Field of Classification Search
CPC .. G06F 12/1458; G06F 9/5016; G06F 9/5022; G06F 2212/1052; G06F 2212/154; G06F 12/1081; G06F 12/1491
See application file for complete search history.

(56) References Cited

U.S. PATENT DOCUMENTS

| 4,805,137 A | 2/1989 | Grant et al. |
| 4,949,299 A | 8/1990 | Pickett |
| 5,367,688 A | 11/1994 | Croll |
| 5,467,459 A | 11/1995 | Alexander et al. |

(Continued)

FOREIGN PATENT DOCUMENTS

| EP | 3013008 A1 | 4/2016 |
| JP | H02306082 A | 12/1990 |

(Continued)

OTHER PUBLICATIONS

Moon-Sang Lee, Joonwon Lee and S. Maeng, "Context-aware address translation for high-performance SMP cluster system," 2008u IEEE International Conference on Cluster Computing, Tsukuba, 2008, pp. 292-297, doi: 10.1109/CLUSTR.2008.4663784. (Year: 2008).

(Continued)

*Primary Examiner* — Michael A Keller
(74) *Attorney, Agent, or Firm* — Sterne, Kessler, Goldstein & Fox P.L.L.C.

(57) ABSTRACT

Methods and apparatus for device driver operation in non-kernel space. In one embodiment, an apparatus configured to configured to interface to a component device driver within non-kernel space is disclosed. The exemplary embodiment restricts device drivers to fewer privileges than kernel processes, while still providing acceptable real-time performance. In another embodiment, mechanisms for non-kernel space device driver operation are described. In one exemplary embodiment, a shared memory interface between kernel space and device drivers enables e.g., a zero-copy device driver architecture.

20 Claims, 13 Drawing Sheets

(56) References Cited

U.S. PATENT DOCUMENTS

| | | |
|---|---|---|
| 5,485,578 A | 1/1996 | Sweazey |
| 5,506,968 A | 4/1996 | Dukes |
| 5,613,086 A | 3/1997 | Frey et al. |
| 5,659,542 A | 8/1997 | Bell et al. |
| 5,708,779 A | 1/1998 | Graziano et al. |
| 5,731,973 A | 3/1998 | Takaishi et al. |
| 5,850,395 A | 12/1998 | Hauser et al. |
| 5,903,564 A | 5/1999 | Ganmukhi et al. |
| 5,943,507 A | 8/1999 | Cornish et al. |
| 6,008,992 A | 12/1999 | Kawakami |
| 6,032,179 A | 2/2000 | Osborne |
| 6,216,178 B1 | 4/2001 | Stracovsky et al. |
| 6,233,702 B1 | 5/2001 | Horst et al. |
| 6,260,152 B1 | 7/2001 | Cole et al. |
| 6,349,355 B1 | 2/2002 | Draves et al. |
| 6,359,863 B1 | 3/2002 | Varma et al. |
| 6,411,997 B1 | 6/2002 | Dawes et al. |
| 6,485,081 B1 | 11/2002 | Bingle et al. |
| 6,523,073 B1 | 2/2003 | Kammer et al. |
| 6,553,446 B1 | 4/2003 | Miller |
| 6,693,895 B1 | 2/2004 | Crummey et al. |
| 6,815,873 B2 | 11/2004 | Johnson et al. |
| 6,874,075 B2 | 3/2005 | Jerding et al. |
| 6,948,094 B2 | 9/2005 | Schultz et al. |
| 6,973,701 B2 | 12/2005 | Momoda et al. |
| 6,990,594 B2 | 1/2006 | Kim |
| 7,013,536 B2 | 3/2006 | Golden et al. |
| 7,032,282 B2 | 4/2006 | Powell et al. |
| 7,100,020 B1 | 8/2006 | Brightman et al. |
| 7,111,307 B1 | 9/2006 | Wang |
| 7,127,600 B2 | 10/2006 | Zimmer et al. |
| 7,152,231 B1 | 12/2006 | Galluscio et al. |
| 7,281,172 B2 | 10/2007 | Chujo |
| 7,397,774 B1 | 7/2008 | Holland et al. |
| 7,398,382 B2 | 7/2008 | Rothman et al. |
| 7,403,542 B1 | 7/2008 | Thompson |
| 7,506,084 B2 | 3/2009 | Moerti et al. |
| 7,509,391 B1 | 3/2009 | Chauvel et al. |
| 7,587,575 B2 | 9/2009 | Moertl et al. |
| 7,590,817 B2 | 9/2009 | Moertl et al. |
| 7,617,377 B2 | 11/2009 | Moertl et al. |
| 7,681,012 B2 | 3/2010 | Verma et al. |
| 7,685,476 B2 | 3/2010 | Andre et al. |
| 7,802,256 B2 | 9/2010 | Havens |
| 7,853,731 B1 | 12/2010 | Zeng |
| 7,899,941 B2 | 3/2011 | Hendry et al. |
| 7,941,682 B2 | 5/2011 | Adams |
| 8,214,707 B2 | 7/2012 | Munson et al. |
| 8,230,248 B2 | 7/2012 | Dance et al. |
| 8,239,947 B1 | 8/2012 | Glick et al. |
| 8,255,725 B2 | 8/2012 | Shimazaki et al. |
| 8,271,996 B1 | 9/2012 | Gould et al. |
| 8,352,624 B2 | 1/2013 | Zimmerman et al. |
| 8,468,285 B2 | 6/2013 | Kobayashi |
| 8,555,099 B2 | 10/2013 | Marinkovic et al. |
| 8,561,090 B2 | 10/2013 | Schneider |
| 8,635,412 B1 | 1/2014 | Wilshire |
| 8,656,228 B2 | 2/2014 | Check et al. |
| 8,769,168 B2 | 7/2014 | Moertl et al. |
| 8,788,822 B1 | 7/2014 | Riddle |
| 8,799,537 B1 | 8/2014 | Zhu et al. |
| 8,806,640 B2 | 8/2014 | Wang |
| 8,819,386 B1 | 8/2014 | Mather |
| 8,848,809 B2 | 9/2014 | Whitby-Strevens |
| 8,855,120 B2 | 10/2014 | Robbins |
| 8,876,062 B1 | 11/2014 | Baghdasarian |
| 9,049,179 B2 | 6/2015 | Luna |
| 9,130,864 B2 | 9/2015 | Keith |
| 9,135,059 B2 | 9/2015 | Ballard et al. |
| 9,152,580 B1 | 10/2015 | Chau et al. |
| 9,170,957 B2 | 10/2015 | Touzni et al. |
| 9,280,360 B2 | 3/2016 | Xu et al. |
| 9,319,090 B2 | 4/2016 | Whitby-Strevens |
| 9,483,305 B1 | 11/2016 | Shmidt et al. |
| 9,544,069 B2 | 1/2017 | Whitby-Strevens et al. |
| 9,547,535 B1 | 1/2017 | Wilt |
| 9,594,718 B2 | 3/2017 | Kaushik et al. |
| 9,769,756 B1 | 9/2017 | Cui et al. |
| 9,830,289 B2 | 11/2017 | Pulyala et al. |
| 9,910,475 B2 | 3/2018 | Kurts et al. |
| 9,913,305 B2 | 3/2018 | Pinheiro et al. |
| 9,932,757 B2 | 4/2018 | Hager |
| 9,959,124 B1 | 5/2018 | Herbeck et al. |
| 9,985,904 B2 | 5/2018 | Shalev et al. |
| 10,078,361 B2 | 9/2018 | Sanghi et al. |
| 10,230,608 B2 | 3/2019 | Tsirkin |
| 10,289,555 B1 | 5/2019 | Michaud et al. |
| 10,331,600 B1 | 6/2019 | Rajadnya et al. |
| 10,331,612 B1 | 6/2019 | Petkov et al. |
| 10,534,601 B1 | 1/2020 | Venkata et al. |
| 10,552,072 B1 | 2/2020 | Bono et al. |
| 10,678,432 B1 | 6/2020 | Dreier et al. |
| 10,798,059 B1 | 10/2020 | Singh et al. |
| 10,798,224 B2 | 10/2020 | Masputra et al. |
| 10,819,831 B2 | 10/2020 | Masputra et al. |
| 10,999,132 B1 | 5/2021 | Sagar et al. |
| 11,095,758 B2 | 8/2021 | Masputra et al. |
| 11,146,665 B2 | 10/2021 | Masputra et al. |
| 11,159,651 B2 | 10/2021 | Masputra et al. |
| 11,178,259 B2 | 11/2021 | Masputra et al. |
| 11,178,260 B2 | 11/2021 | Masputra et al. |
| 11,212,373 B2 | 12/2021 | Masputra et al. |
| 11,368,560 B2 | 6/2022 | Masputra et al. |
| 11,477,123 B2 | 10/2022 | Masputra et al. |
| 11,558,348 B2 | 1/2023 | Masputra et al. |
| 2001/0037410 A1 | 11/2001 | Gardner |
| 2002/0013868 A1 | 1/2002 | West |
| 2002/0044553 A1 | 4/2002 | Chakravorty |
| 2002/0053011 A1 | 5/2002 | Aiken et al. |
| 2002/0065867 A1 | 5/2002 | Chauvel |
| 2002/0169938 A1 | 11/2002 | Scott et al. |
| 2002/0195177 A1 | 12/2002 | Hinkley et al. |
| 2003/0014607 A1 | 1/2003 | Slavin et al. |
| 2003/0061395 A1 | 3/2003 | Kingsbury et al. |
| 2003/0120935 A1 | 6/2003 | Teal et al. |
| 2003/0200413 A1 | 10/2003 | Gurumoorthy et al. |
| 2004/0010473 A1 | 1/2004 | Hsu et al. |
| 2004/0010545 A1 | 1/2004 | Pandya |
| 2004/0044929 A1 | 3/2004 | Chujo |
| 2004/0105384 A1 | 6/2004 | Gallezot et al. |
| 2004/0128568 A1 | 7/2004 | O'Shea |
| 2004/0179546 A1 | 9/2004 | McDaniel et al. |
| 2004/0201749 A1 | 10/2004 | Malloy Desormeaux |
| 2004/0221056 A1 | 11/2004 | Kobayashi |
| 2004/0228365 A1 | 11/2004 | Kobayashi |
| 2004/0249957 A1 | 12/2004 | Ekis et al. |
| 2005/0055406 A1 | 3/2005 | Singhai et al. |
| 2005/0068897 A1 | 3/2005 | Arita et al. |
| 2005/0076196 A1 | 4/2005 | Zimmer et al. |
| 2005/0076244 A1 | 4/2005 | Watanabe |
| 2005/0108385 A1 | 5/2005 | Wechter et al. |
| 2005/0114620 A1 | 5/2005 | Justen |
| 2005/0117601 A1 | 6/2005 | Anderson et al. |
| 2005/0138628 A1 | 6/2005 | Bradford et al. |
| 2005/0140683 A1 | 6/2005 | Collins et al. |
| 2005/0149711 A1 | 7/2005 | Zimmer et al. |
| 2005/0157781 A1 | 7/2005 | Ho et al. |
| 2005/0198777 A1 | 9/2005 | Mabe |
| 2005/0278498 A1 | 12/2005 | Ahluwalia et al. |
| 2005/0285862 A1 | 12/2005 | Noda et al. |
| 2006/0039285 A1 | 2/2006 | Chapman et al. |
| 2006/0047989 A1 | 3/2006 | Delgado et al. |
| 2006/0075119 A1 | 4/2006 | Hussain et al. |
| 2006/0107071 A1 | 5/2006 | Girish et al. |
| 2006/0136570 A1 | 6/2006 | Pandya |
| 2006/0186700 A1 | 8/2006 | Browne et al. |
| 2006/0186706 A1 | 8/2006 | Browne et al. |
| 2006/0215697 A1 | 9/2006 | Olderdissen |
| 2006/0218301 A1 | 9/2006 | O'Toole et al. |
| 2006/0232051 A1 | 10/2006 | Morris et al. |
| 2006/0248542 A1 | 11/2006 | Wang et al. |
| 2007/0005869 A1 | 1/2007 | Balraj et al. |
| 2007/0008983 A1 | 1/2007 | Van Doren et al. |
| 2007/0043901 A1 | 2/2007 | Wu et al. |

(56) References Cited

U.S. PATENT DOCUMENTS

| | | |
|---|---|---|
| 2007/0063540 A1 | 3/2007 | Browne et al. |
| 2007/0063541 A1 | 3/2007 | Browne et al. |
| 2007/0070997 A1 | 3/2007 | Weitz et al. |
| 2007/0080013 A1 | 4/2007 | Melz et al. |
| 2007/0086480 A1 | 4/2007 | Elzur |
| 2007/0118831 A1 | 5/2007 | Kondo |
| 2007/0180041 A1 | 8/2007 | Suzuoki |
| 2007/0183418 A1 | 8/2007 | Riddoch et al. |
| 2007/0201492 A1 | 8/2007 | Kobayashi |
| 2007/0226375 A1 | 9/2007 | Chu et al. |
| 2007/0226417 A1 | 9/2007 | Davis |
| 2007/0255802 A1 | 11/2007 | Aloni et al. |
| 2007/0255866 A1 | 11/2007 | Aloni et al. |
| 2007/0261307 A1 | 11/2007 | Alexander |
| 2007/0286246 A1 | 12/2007 | Kobayashi |
| 2008/0005794 A1 | 1/2008 | Inoue et al. |
| 2008/0007081 A1 | 1/2008 | Shibata et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0100079 A1 | 5/2008 | Herrera et al. |
| 2008/0100092 A1 | 5/2008 | Gao et al. |
| 2008/0120911 A1 | 5/2008 | Browne et al. |
| 2008/0127292 A1 | 5/2008 | Cooper et al. |
| 2008/0148291 A1 | 6/2008 | Huang et al. |
| 2008/0183931 A1 | 7/2008 | Verm et al. |
| 2008/0231711 A1 | 9/2008 | Glen et al. |
| 2008/0235355 A1 | 9/2008 | Spanier et al. |
| 2008/0244259 A1 | 10/2008 | Zimmer et al. |
| 2008/0301148 A1 | 12/2008 | Lee et al. |
| 2009/0006920 A1 | 1/2009 | Munson et al. |
| 2009/0024924 A1 | 1/2009 | Kim |
| 2009/0092057 A1 | 4/2009 | Doctor et al. |
| 2009/0113141 A1 | 4/2009 | Bullman et al. |
| 2009/0138650 A1 | 5/2009 | Lin et al. |
| 2009/0172674 A1 | 7/2009 | Bobak et al. |
| 2009/0177847 A1 | 7/2009 | Ceze et al. |
| 2009/0189442 A1 | 7/2009 | Chi |
| 2009/0225818 A1 | 9/2009 | Dapper et al. |
| 2009/0240874 A1 | 9/2009 | Pong |
| 2009/0265723 A1 | 10/2009 | Mochizuki et al. |
| 2009/0322531 A1 | 12/2009 | Estevez et al. |
| 2010/0005014 A1 | 1/2010 | Castle et al. |
| 2010/0017655 A1 | 1/2010 | Gooding et al. |
| 2010/0049876 A1 | 2/2010 | Pope et al. |
| 2010/0057932 A1 | 3/2010 | Pope et al. |
| 2010/0082859 A1 | 4/2010 | Hendry et al. |
| 2010/0098419 A1 | 4/2010 | Levy et al. |
| 2010/0118041 A1* | 5/2010 | Chen ................ G06F 12/1036 345/542 |
| 2010/0329319 A1 | 12/2010 | Dai et al. |
| 2011/0029696 A1 | 2/2011 | Uehara |
| 2011/0035575 A1 | 2/2011 | Kwon |
| 2011/0052142 A1 | 3/2011 | Sultenfuss et al. |
| 2011/0083002 A1 | 4/2011 | Albers et al. |
| 2011/0161619 A1 | 6/2011 | Kaminski et al. |
| 2011/0219208 A1 | 9/2011 | Asaad et al. |
| 2011/0242425 A1 | 10/2011 | Zeng |
| 2011/0246742 A1 | 10/2011 | Kogen et al. |
| 2011/0276710 A1 | 11/2011 | Mighani et al. |
| 2011/0292936 A1 | 12/2011 | Wang et al. |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0036334 A1 | 2/2012 | Horman et al. |
| 2012/0072658 A1 | 3/2012 | Hashimoto |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama |
| 2012/0203880 A1 | 8/2012 | Kluyt et al. |
| 2012/0224640 A1 | 9/2012 | Sole Rojals et al. |
| 2012/0229076 A1 | 9/2012 | Zhu et al. |
| 2012/0260017 A1 | 10/2012 | Mine et al. |
| 2013/0039278 A1 | 2/2013 | Bouazizi et al. |
| 2013/0050216 A1 | 2/2013 | Whitby-Strevens et al. |
| 2013/0057567 A1 | 3/2013 | Frank et al. |
| 2013/0067188 A1 | 3/2013 | Mehra et al. |
| 2013/0091772 A1 | 4/2013 | Berger et al. |
| 2013/0111014 A1 | 5/2013 | Lawrie et al. |
| 2013/0138840 A1 | 5/2013 | Kegel et al. |
| 2013/0162911 A1 | 6/2013 | Glen |
| 2013/0204927 A1 | 8/2013 | Kruglikov et al. |
| 2013/0205113 A1 | 8/2013 | Ahmad et al. |
| 2013/0275976 A1 | 10/2013 | Dawson et al. |
| 2013/0290947 A1 | 10/2013 | Li |
| 2013/0347131 A1 | 12/2013 | Mooring et al. |
| 2014/0033220 A1 | 1/2014 | Campbell et al. |
| 2014/0068624 A1 | 3/2014 | Fuller et al. |
| 2014/0068636 A1 | 3/2014 | Dupont et al. |
| 2014/0122695 A1 | 5/2014 | Kulikov et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0211894 A1 | 7/2014 | Yang |
| 2014/0247983 A1 | 9/2014 | MacInnis et al. |
| 2014/0355606 A1 | 12/2014 | Riddoch et al. |
| 2015/0007262 A1 | 1/2015 | Aissi et al. |
| 2015/0036051 A1 | 2/2015 | Broberg et al. |
| 2015/0058444 A1 | 2/2015 | Willmann |
| 2015/0081985 A1 | 3/2015 | Archer et al. |
| 2015/0156122 A1 | 6/2015 | Singh et al. |
| 2015/0172345 A1 | 6/2015 | Mantin et al. |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0244804 A1 | 8/2015 | Warfield et al. |
| 2015/0261588 A1 | 9/2015 | Liu et al. |
| 2015/0309940 A1 | 10/2015 | Kumar |
| 2015/0326542 A1 | 11/2015 | Serebrin |
| 2015/0363110 A1 | 12/2015 | Batra et al. |
| 2015/0370582 A1 | 12/2015 | Kinsella et al. |
| 2015/0378737 A1 | 12/2015 | Debbage et al. |
| 2016/0028635 A1 | 1/2016 | Wang |
| 2016/0034195 A1 | 2/2016 | Li et al. |
| 2016/0041852 A1 | 2/2016 | Suarez Gracia et al. |
| 2016/0044143 A1 | 2/2016 | Narasimhamurthy |
| 2016/0063258 A1 | 3/2016 | Ackerly |
| 2016/0077989 A1 | 3/2016 | Pulyala et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |
| 2016/0208539 A1 | 7/2016 | Hofmann et al. |
| 2016/0224442 A1 | 8/2016 | Sanghi et al. |
| 2016/0226957 A1 | 8/2016 | Zhang et al. |
| 2016/0226967 A1 | 8/2016 | Zhang et al. |
| 2016/0231917 A1 | 8/2016 | Tsirkin |
| 2016/0261632 A1 | 9/2016 | Kölhi et al. |
| 2016/0269991 A1 | 9/2016 | Van Greunen et al. |
| 2016/0357443 A1 | 12/2016 | Li et al. |
| 2016/0363955 A1 | 12/2016 | Stevens et al. |
| 2016/0364350 A1 | 12/2016 | Sanghi et al. |
| 2016/0378545 A1 | 12/2016 | Ho |
| 2017/0003977 A1 | 1/2017 | Sumida et al. |
| 2017/0003997 A1 | 1/2017 | Kelly et al. |
| 2017/0075856 A1 | 3/2017 | Suzue et al. |
| 2017/0089641 A1 | 3/2017 | Humfeld et al. |
| 2017/0108912 A1 | 4/2017 | Li et al. |
| 2017/0111283 A1 | 4/2017 | Kumar et al. |
| 2017/0124327 A1 | 5/2017 | Kumbhar et al. |
| 2017/0126726 A1 | 5/2017 | Han |
| 2017/0147282 A1 | 5/2017 | Seo |
| 2017/0149890 A1 | 5/2017 | Shamis et al. |
| 2017/0187621 A1 | 6/2017 | Shalev et al. |
| 2017/0187846 A1 | 6/2017 | Shalev et al. |
| 2017/0249098 A1 | 8/2017 | Petkov et al. |
| 2017/0264497 A1 | 9/2017 | Lim |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2017/0308460 A1 | 10/2017 | Guthula et al. |
| 2017/0337588 A1 | 11/2017 | Chittilappilly et al. |
| 2017/0353499 A1 | 12/2017 | Huang et al. |

(56) References Cited

U.S. PATENT DOCUMENTS

| | | |
|---|---|---|
| 2017/0371591 A1 | 12/2017 | Xia et al. |
| 2018/0004690 A1 | 1/2018 | Kaminski et al. |
| 2018/0070341 A1 | 3/2018 | Islam et al. |
| 2018/0081829 A1 | 3/2018 | Kaplan |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0173643 A1 | 6/2018 | Yu et al. |
| 2018/0196648 A1 | 7/2018 | Henderson et al. |
| 2018/0219805 A1 | 8/2018 | MacNeil et al. |
| 2018/0219976 A1 | 8/2018 | Decenzo et al. |
| 2018/0239657 A1 | 8/2018 | Petrbok et al. |
| 2018/0248847 A1 | 8/2018 | Guri et al. |
| 2018/0253315 A1 | 9/2018 | Norton et al. |
| 2018/0285561 A1 | 10/2018 | Frank et al. |
| 2018/0295052 A1 | 10/2018 | St. Laurent |
| 2018/0329743 A1 | 11/2018 | Pope et al. |
| 2018/0343206 A1 | 11/2018 | White et al. |
| 2018/0357176 A1 | 12/2018 | Wang |
| 2019/0007850 A1 | 1/2019 | DenBoer et al. |
| 2019/0036893 A1 | 1/2019 | Jiang |
| 2019/0052659 A1 | 2/2019 | Weingarten et al. |
| 2019/0065301 A1 | 2/2019 | Tsirkin et al. |
| 2019/0097938 A1 | 3/2019 | Talla et al. |
| 2019/0102303 A1 | 4/2019 | Wang et al. |
| 2019/0102568 A1 | 4/2019 | Hausauer et al. |
| 2019/0109714 A1 | 4/2019 | Clark et al. |
| 2019/0140983 A1 | 5/2019 | Tu et al. |
| 2019/0141041 A1 | 5/2019 | Bhabbur et al. |
| 2019/0147066 A1 | 5/2019 | Ben Dayan et al. |
| 2019/0147069 A1 | 5/2019 | Ben Dayan et al. |
| 2019/0205533 A1 | 7/2019 | Diehl et al. |
| 2019/0213044 A1 | 7/2019 | Cui et al. |
| 2019/0213166 A1 | 7/2019 | Petkov et al. |
| 2019/0253351 A1 | 8/2019 | Ihlar et al. |
| 2019/0286466 A1 | 9/2019 | Tsirkin et al. |
| 2019/0303204 A1 | 10/2019 | Masputra et al. |
| 2019/0303205 A1 | 10/2019 | Masputra et al. |
| 2019/0303221 A1 | 10/2019 | Masputra et al. |
| 2019/0303222 A1 | 10/2019 | Masputra et al. |
| 2019/0303280 A1 | 10/2019 | Masputra et al. |
| 2019/0303562 A1 | 10/2019 | Masputra et al. |
| 2019/0303576 A1 | 10/2019 | Masputra et al. |
| 2019/0306076 A1 | 10/2019 | Masputra et al. |
| 2019/0306087 A1 | 10/2019 | Masputra et al. |
| 2019/0306109 A1 | 10/2019 | Masputra et al. |
| 2019/0306281 A1 | 10/2019 | Masputra et al. |
| 2019/0306282 A1 | 10/2019 | Masputra et al. |
| 2020/0019695 A1 | 1/2020 | Sovio et al. |
| 2020/0036615 A1 | 1/2020 | Lewis |
| 2020/0045015 A1 | 2/2020 | Nukala et al. |
| 2020/0065244 A1 | 2/2020 | Sanghi et al. |
| 2020/0073829 A1 | 3/2020 | Tsirkin et al. |
| 2020/0195684 A1 | 6/2020 | Linz |
| 2021/0011856 A1 | 1/2021 | Xia et al. |
| 2021/0099391 A1 | 4/2021 | Masputra et al. |
| 2021/0099427 A1 | 4/2021 | Masputra et al. |
| 2022/0030095 A1 | 1/2022 | Masputra et al. |
| 2022/0046117 A1 | 2/2022 | Masputra et al. |

FOREIGN PATENT DOCUMENTS

| | | |
|---|---|---|
| JP | H03169996 A | 7/1991 |
| JP | 2004086792 A | 3/2004 |
| JP | 2012108677 A | 6/2012 |
| JP | 2013246642 A | 12/2013 |
| JP | 2015001867 A | 1/2015 |
| WO | WO 2008070138 A2 | 6/2008 |

OTHER PUBLICATIONS

Honda et al, "Rekindling Network Protocol Innovation with User-Level Stacks", ACM SIGCOMM Computer Communication Review, vol. 44, No. 2, Apr. 2014.

Gopalakrishnan R., et al., "Efficient User-Space Protocol Implementations with QoS Guarantees Using Real-Time Upcalls", IEEE/ACM Transactions on Networking, Aug. 1998, vol. 6 (4), pp. 374-388.

ECN L1 PM Substates with CLKREQ approved Aug. 23, 2012.

Jackson, "PCI Express Technology", Sep. 2012 (Sep. 2012), MindShare Press, xP002777351, pp. 49,86,87,712-723.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

Whitworth, "Improving Networking by moving the network stack to userspace", Imperial College London, Jun. 14, 2010 [Mar. 17, 2022]; retrieved from the Internet: <URL https://www.doc.ic.ac.uk/teaching/distinguished-projects/2010/m.whitworth.pdf> (Year: 2010).

* cited by examiner

METHODS AND APPARATUS FOR DEVICE DRIVER OPERATION IN NON-KERNEL SPACE

PRIORITY

This application claims the benefit of priority to U.S. Provisional Patent Application Ser. No. 62/906,657 filed Sep. 26, 2019 and entitled "Methods and Apparatus for Device Driver Operation in Non-Kernel Space", which is incorporated herein by reference in its entirety.

RELATED APPLICATIONS

This application is related to U.S. patent application Ser. No. 16/144,992 filed Sep. 27, 2018 and entitled "Methods and Apparatus for Single Entity Buffer Pool Management", U.S. patent application Ser. No. 16/146,533 filed Sep. 28, 2018 and entitled "Methods and Apparatus for Regulating Networking Traffic in Bursty System Conditions", U.S. patent application Ser. No. 16/146,324 filed Sep. 28, 2018 and entitled "Methods and Apparatus for Preventing Packet Spoofing with User Space Communication Stacks", U.S. patent application Ser. No. 16/146,916 filed Sep. 28, 2018 and entitled "Methods and Apparatus for Channel Defunct Within User Space Stack Architectures", U.S. patent application Ser. No. 14/236,032 filed Dec. 28, 2018 and entitled "Methods and Apparatus for Classification of Flow Metadata with User Space Communication Stacks", U.S. patent application Ser. No. 16/363,495 filed Mar. 25, 2019 and entitled "Methods and Apparatus for Dynamic Packet Pool Configuration in Networking Stack Infrastructures", U.S. patent application Ser. No. 14/368,396 filed on Mar. 26, 2019 and entitled "Methods and Apparatus for User Space Communication Stacks", U.S. patent application Ser. No. 16/363,495 filed on Mar. 25, 2019 and entitled "Methods and Apparatus for Dynamic Packet Pool Configuration in Networking Stack Infrastructures", U.S. patent application Ser. No. 14/368,338 filed on Mar. 28, 2019 and entitled "Methods and Apparatus for Memory Allocation and Reallocation in Networking Stack Infrastructures", U.S. patent application Ser. No. 16/365,484 filed on Mar. 26, 2019 and entitled "Methods and Apparatus for Virtualized Hardware Optimizations for User Space Networking", U.S. patent application Ser. No. 16/368,368 filed on Mar. 28, 2019 and entitled "Methods and Apparatus for Active Queue Management in User Space Networking", and U.S. patent application Ser. No. 16/368,214 filed on Mar. 28, 2019 and entitled "Methods and Apparatus for Self-Tuning Operation with User Space Stack Architectures", U.S. patent application Ser. No. 16/936,228, filed on Jul. 22, 2020 and entitled "Methods and Apparatus for Low Latency Operation in User Space Networking", and U.S. patent application Ser. No. 16/935,982, filed on Jul. 22, 2020 and entitled "Methods and Apparatus for Emerging Use Case Support in User Space Networking", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technical Field

The disclosure relates generally to the field of electronic devices, as well as networks thereof. More particularly, the disclosure is directed to methods and apparatus for implementing computerized networking stack infrastructures.

2. Description of Related Technology

The consumer electronics industry has seen explosive growth in network connectivity; for example, Internet connectivity is now virtually ubiquitous across many different device types for a variety of different applications and functionalities. The successful implementation of network connectivity over a myriad of different usage cases has been enabled by, inter alia, the principles of modular design and abstraction. Specifically, the traditional network communication paradigm incorporates multiple (generally) modular software "layers" into a "communication stack." Each layer of the communication stack separately manages its own implementation specific considerations, and provides an "abstracted" communication interface to the next layer. In this manner, different applications can communicate freely across different devices without considering the underlying network transport.

The traditional network communication paradigm has been relatively stable for over 30 years. The Assignee hereof has developed its own implementation of a computer networking stack (based on the traditional networking paradigm) that is mature, robust, and feature-rich (yet conservative). This networking stack is the foundation for virtually all networking capabilities, including those used across the Assignee's products (e.g., MacBook®, iMac®, iPad®, and iPhone®, etc.) and has been designed to handle a variety of protocols (such as TCP (Transmission Control Protocol), UDP (User Datagram Protocol) and IP (Internet Protocol)), and proprietary extensions and functionalities.

While the traditional network communication paradigm has many benefits, changes in the commercial landscape have stretched the capabilities of the existing implementations. Over the past few years, new use cases have emerged that require capabilities beyond those of the traditional networking stack design. For example, some use cases require control and data movement operations to be performed in so-called "user space" (software that is executed outside the kernel, and specific to a user process). Common examples of such applications include without limitation e.g. Virtual Private Networks (VPN), application proxy, content and traffic filtering, and any number of other network-aware user applications.

Additionally, as networking technologies continue to advance at a rapid pace, component devices are often pushed to market quickly. In some cases, immature device driver operation can introduce instability and/or insecurity into "kernel space."

Unfortunately, the current one-size-fits-all networking stack was not designed for (and is thus ill-suited to) the requirements of the aforementioned use cases (and others contemplated herein). More directly, supporting user space applications and associated components from within the traditional in-kernel networking stack architecture adds complexity, increases technical debts (the implied cost of rework attributed to deploying a faster, but suboptimal, implementation), brings in higher processing costs, and results in suboptimal performance and higher power consumption.

To these ends, a networking stack architecture and technology that caters to emerging non-kernel use cases is needed. Ideally, such solutions would at least in some scenarios isolate at least some device driver operation from kernel space.

SUMMARY

The present disclosure satisfies the foregoing needs by providing, inter alia, methods and apparatus for handling hardware operations within non-kernel space.

A first apparatus is disclosed. In one embodiment, the apparatus includes: a network interface configured to communicate with a network, where the network interface includes a memory buffer; a processor; and a non-transitory computer readable apparatus comprising a storage medium having one or more computer programs stored thereon. In one exemplary embodiment, the one or more computer programs when executed by the processor, causes the apparatus to: receive a request to enable the network interface for a non-kernel space application; determine whether to grant the request; when granted, enable access to the network interface and allocate the memory buffer to the non-kernel space application; and when relinquished, disable the access to the network interface and deallocate the memory buffer from the non-kernel space application.

In one variant, a kernel space addresses the memory buffer via absolute addressing within a memory management unit (MMU). In one such variant, the non-kernel space application addresses the memory buffer via relative addressing within an input/output memory management unit (IOMMU). In a particular implementation, the non-kernel space application cannot access a memory allocation associated with at least one other non-kernel space application. In another such implementation, the non-kernel space application splits the memory buffer into data structures based on an operational parameter of the network.

In one variant, the non-kernel space application includes a device driver that is specific to the network interface.

In one variant, the access includes zero-copy access.

A second apparatus is disclosed. In one embodiment, the apparatus includes: a hardware component; a processor; and a non-transitory computer readable apparatus comprising a storage medium having one or more computer programs stored thereon. In one exemplary embodiment, the one or more computer programs when executed by the processor, causes the apparatus to: request access to the hardware component for a non-kernel space application; configure the hardware component based on a resource granted to the non-kernel space application; and relinquish the hardware component and the resource when the non-kernel space application terminates.

In one variant, the hardware component includes a network interface; and the non-kernel space application includes a network interface specific device driver.

In one variant, a memory buffer of the hardware component is mapped to an input/output memory management unit (IOMMU) controlled by the non-kernel space application. In one such variant, the memory buffer of the hardware component is also mapped to a memory management unit (MMU) controlled by a kernel entity.

In one variant, the hardware component comprises a processor core.

In one variant, the hardware component comprises a power management subsystem.

A method for handling hardware operations within non-kernel space is disclosed. In one embodiment, the method includes: requesting access to a hardware component for a non-kernel entity; configuring the hardware component based on a resource allocation associated with the non-kernel entity; where a kernel space entity and the non-kernel entity jointly access the hardware component; and wherein the non-kernel entity cannot access at least one other kernel space resource.

In one variant, the resource allocation includes an input/output memory management unit (IOMMU) allocated to the non-kernel entity. In one such variant, configuring the hardware component includes mapping the hardware component to the input/output memory management unit (IOMMU). In one variant, the hardware component is also mapped within a memory management unit (MMU) of the kernel space entity.

In one variant, the hardware component is a network interface configured to communicate via a network protocol; and configuring the hardware component is further based on the network protocol.

In one variant, the resource allocation is shared by multiple non-kernel entities.

In one variant, the non-kernel entity is a device driver application that transacts data for a user space application.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a non-transitory computer readable storage apparatus implementing one or more of the foregoing aspects is disclosed and described. In one embodiment, the computer readable apparatus includes a program memory, or an EEPROM. In another embodiment, the apparatus includes a solid-state drive (SSD) or other mass storage device. In another embodiment, the apparatus includes a USB or other "flash drive" or other such portable removable storage device.

Other features and advantages of the present disclosure will immediately be recognized by persons of ordinary skill in the art with reference to the attached drawings and detailed description of exemplary embodiments as given below.

All figures © Copyright 2017-2020 Apple Inc. All rights reserved.

DETAILED DESCRIPTION

Reference is now made to the drawings, wherein like numerals refer to like parts throughout.

Detailed Description of Exemplary Embodiments

Existing Network Socket Technologies

Figure 1:
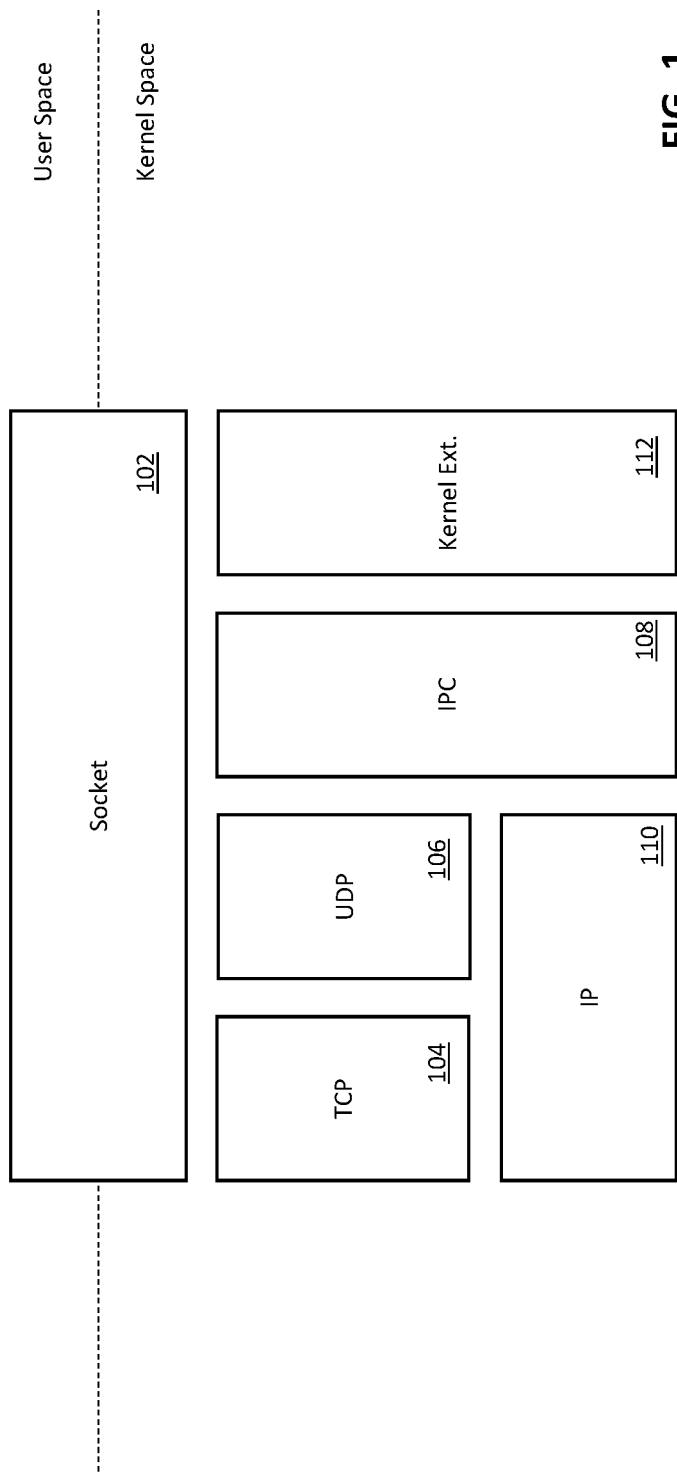
FIG. 1 is a logical representation of a traditional network socket, useful for explaining various aspects of the present disclosure.

FIG. 1 illustrates one logical representation of a traditional network socket 102, useful for explaining various aspects of the traditional networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Processor Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox") and cannot access the memory of other processes unless explicitly allowed. In contrast, the kernel is the core of a computer's operating system; the kernel can exert complete control over all other processes in the system.

The term "operating system" may refer to software that controls and manages access to hardware. An O/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer to any access restriction or permission which restricts or permits processor execution. System privileges are commonly used within the computing arts to, inter alia, mitigate the potential damage of a computer security vulnerability. For instance, a properly privileged computer system will prevent malicious software applications from affecting data and task execution associated with other applications and the kernel.

As used herein, the term "in-kernel" and/or "kernel space" may refer to data and/or processes that are stored in, and/or have privilege to access the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Processor Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP)) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating ~300 sockets). The web browser can write (or read) data to the socket; thereafter, the socket object executes system calls within kernel space to copy (or fetch) data to data structures in the kernel space.

As used herein, the term "domain" may refer to a self-contained memory allocation e.g., user space, kernel space. A "domain crossing" may refer to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area).

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream). Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low-level tasks that cannot be performed in user space. These low-level tasks typically fall into one or more of: low-level device drivers, network filters, and/or file systems. Examples of sockets and/or extensions include without limitation: route (IP route handling), ndry (packet 802.1X handling), key (key management), unix (translations for Unix systems), kernel control, kernel events, parental controls, intrusion detection, content filtering, hypervisors, and/or any number of other kernel tasking.

Kernel extensions and public APIs enable, for example, $3^{rd}$ party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel).

Unfortunately, $3^{rd}$ party kernel extensions can be dangerous and/or undesirable. As previously noted, software applications are restricted for security and stability reasons; however the kernel is largely unrestricted. A $3^{rd}$ party kernel extension can introduce instability issues because the 3rd party kernel extensions run in the same address space as the kernel itself (which is outside the purview of traditional memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the $3^{rd}$ party software developer. This heightened level of access may raise privacy concerns (e.g., the $3^{rd}$ party developer may have access to browsing habits, etc.).

Existing Performance Optimization Technologies

Figure 2:
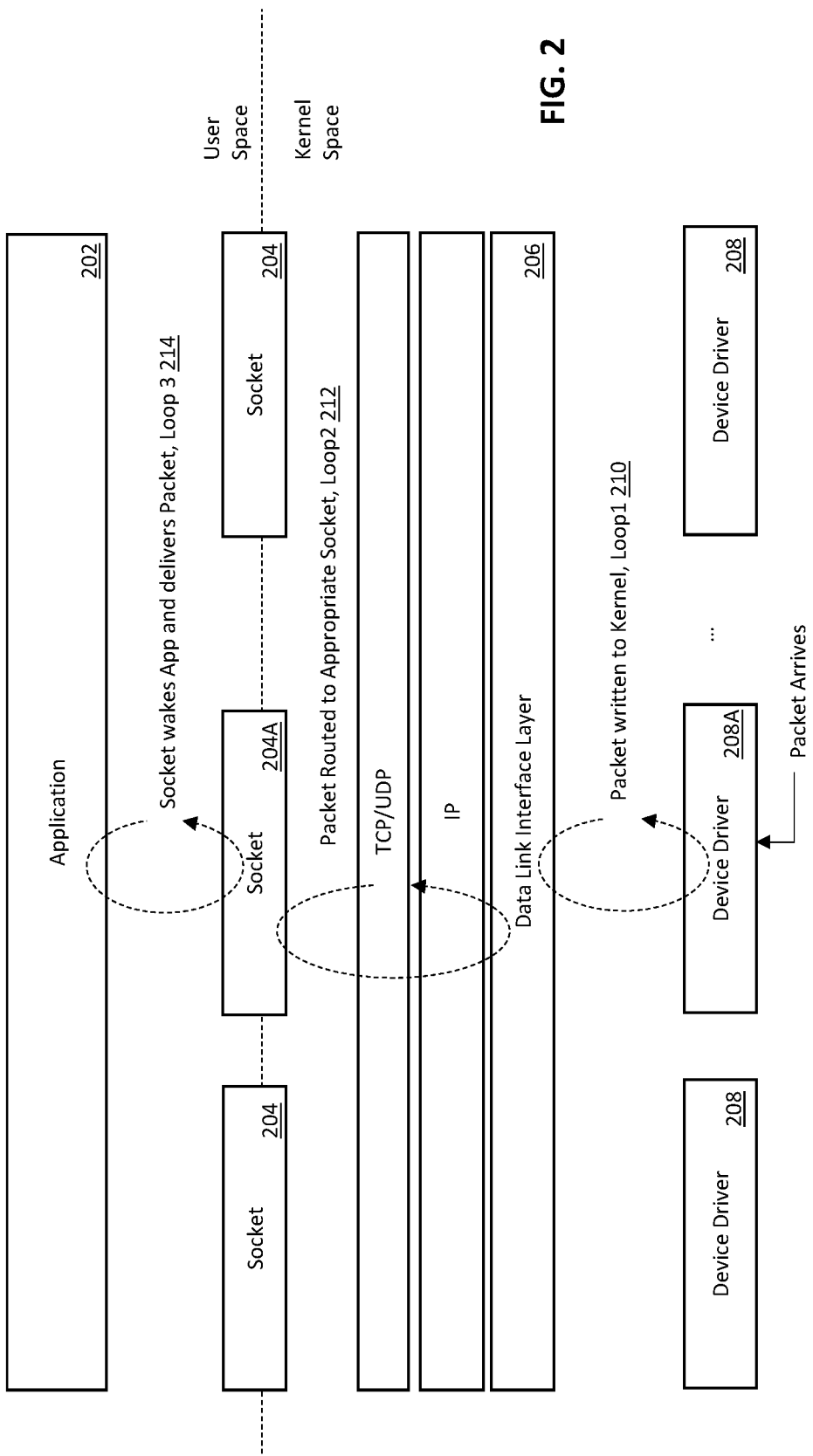
FIG. 2 is a logical representation of a computer system that implements Input/Output (I/O) network control, useful for explaining various aspects of the present disclosure.

FIG. 2 illustrates one logical representation of a computer system that implements Input/Output (I/O) network control, useful for explaining various aspects of traditional network optimization. As depicted therein, a software application 202 executing from user space opens multiple sockets 204 to communicate with e.g., a web server. Each of the sockets interfaces with a Data Link Interface Layer (DLIL) 206.

The DLIL 206 provides a common interface layer to each of the various physical device drivers which will handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing.

Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission.

As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the traditional network communications stack. While implementations may vary from this illustrative example, virtually all networking stacks share substantially the same delivery mechanism. The traditional network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel traditional networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the traditional networking stack for performance based on various "tailored" special cases results in an inordinate amount of software complexity which is untenable to support across the entire ecosystem of devices.

Emerging Use Cases

Figure 3:
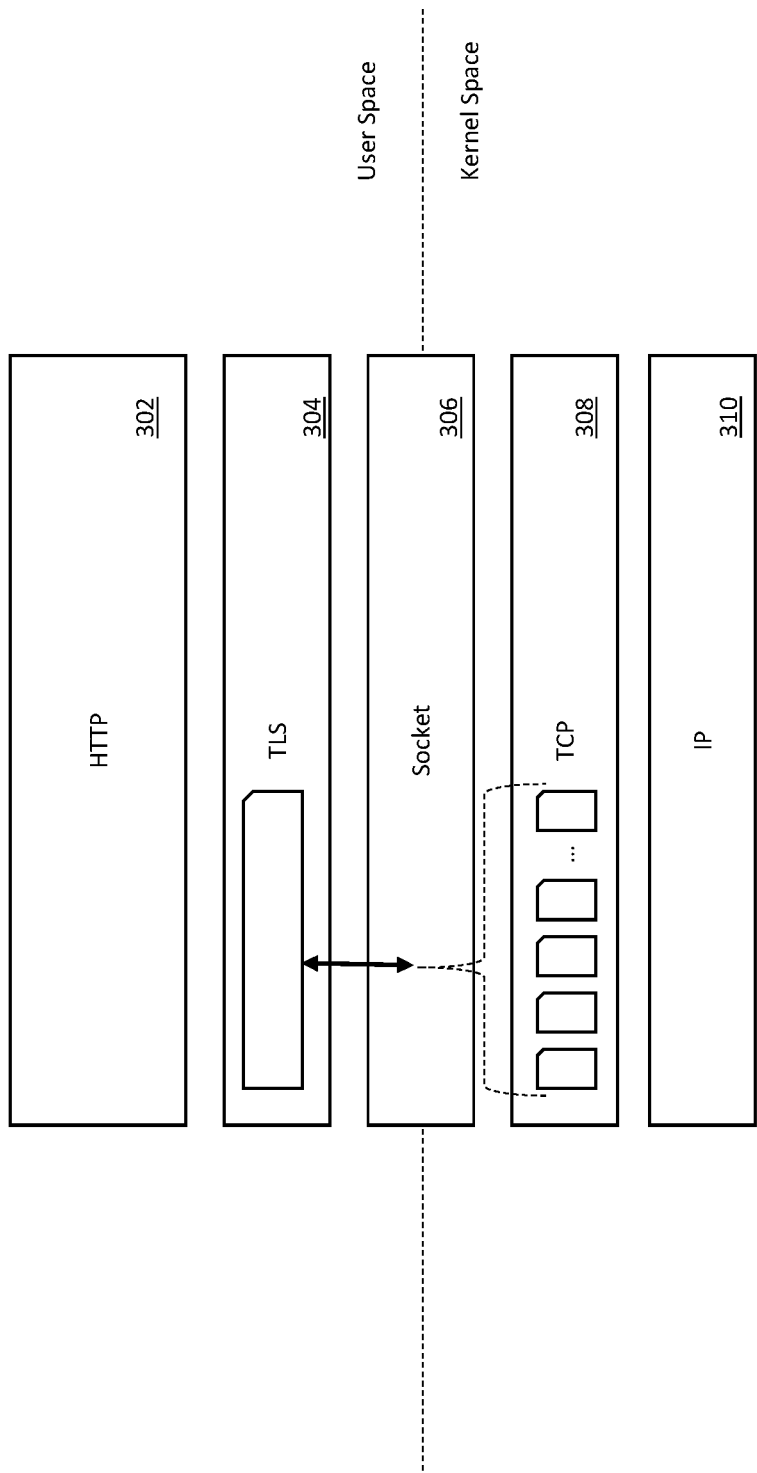
FIG. 3 is a block diagram of one exemplary implementation of Transport Layer Security (TLS), useful for explaining various aspects of the present disclosure.

FIG. 3 illustrates a logical block diagram of one exemplary implementation of Transport Layer Security (TLS) (the successor to Secure Sockets Layer (SSL)), useful to explain user/kernel space integration complexities of emerging use cases.

As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream and extracting the TLS record from the aggregated byte stream. Notably, every TCP packet of the sequence must be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But existing implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some $3^{rd}$ party application developers and device manufacturers have incorporated kernel extensions (or similar operating system capabilities) to provide network condition information to the TLS user space applications; however, kernel extensions are undesirable due to the aforementioned security and privacy concerns. Alternately, some $3^{rd}$ party applications infer the presence of lossy network conditions based on historic TLS record loss. Such inferences are an indirect measure and significantly less accurate and lag behind real-time information (i.e., previous packet loss often does not predict future packet loss).

Figure 4:
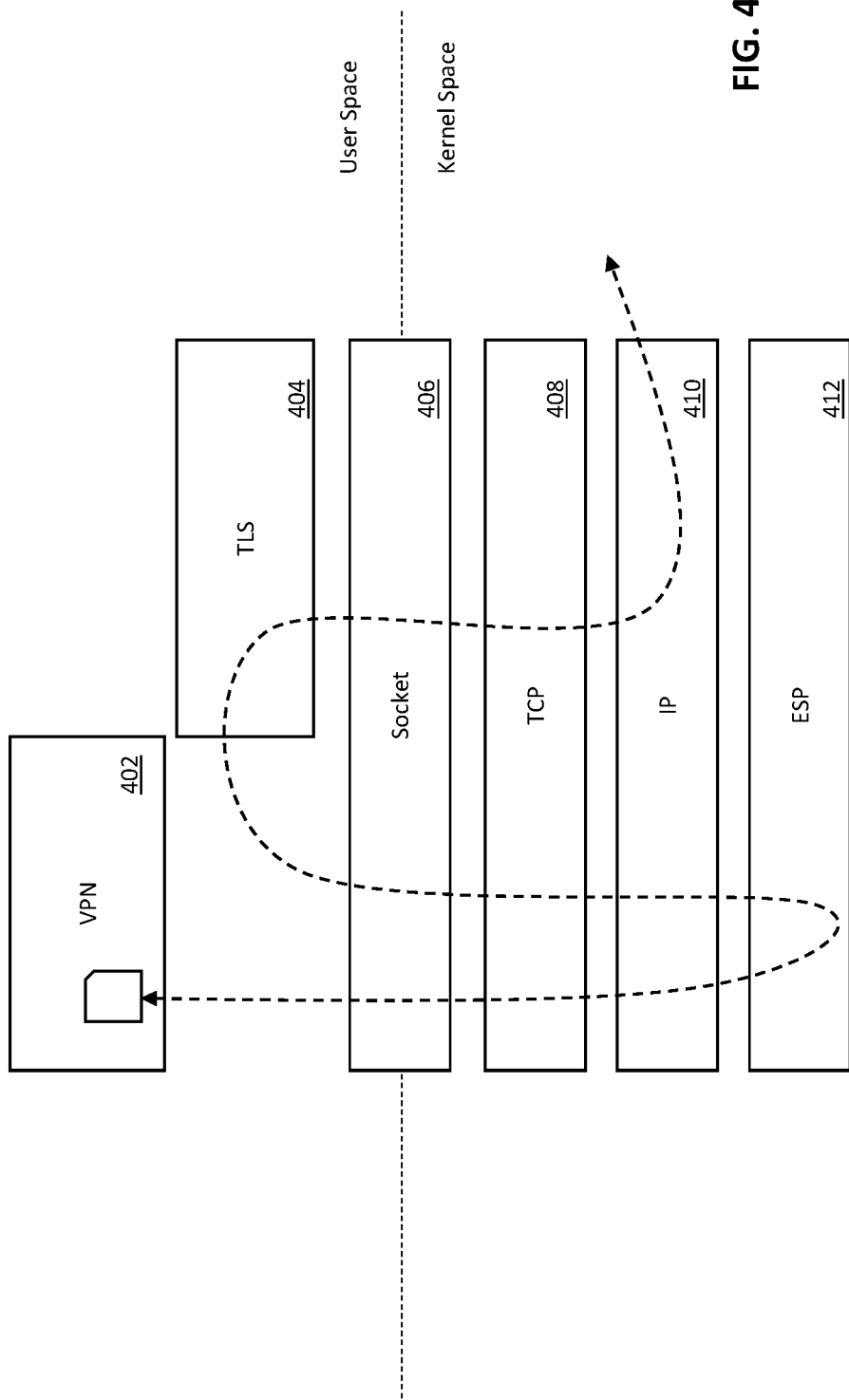
FIG. 4 is a block diagram of an exemplary implementation of a Virtual Private Network (VPN), useful for explaining various aspects of the present disclosure.

FIG. 4 illustrates a logical block diagram of an exemplary implementation of a Virtual Private Network (VPN), useful to explain recursive/cross-layer protocol layer complexities of emerging use cases.

As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data must be validated (which takes non-trivial processing time). Additionally, context switching can introduce significant latency while the task is suspended.

Artisans of ordinary skill in the related arts, given the contents of the present disclosure, will readily appreciate that the exemplary recursive cross layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space). Another common implementation is IP (kernel space) over Quick UDP Internet Connections (QUIC) (user space) over UDP/IP (kernel space).

Figure 5:
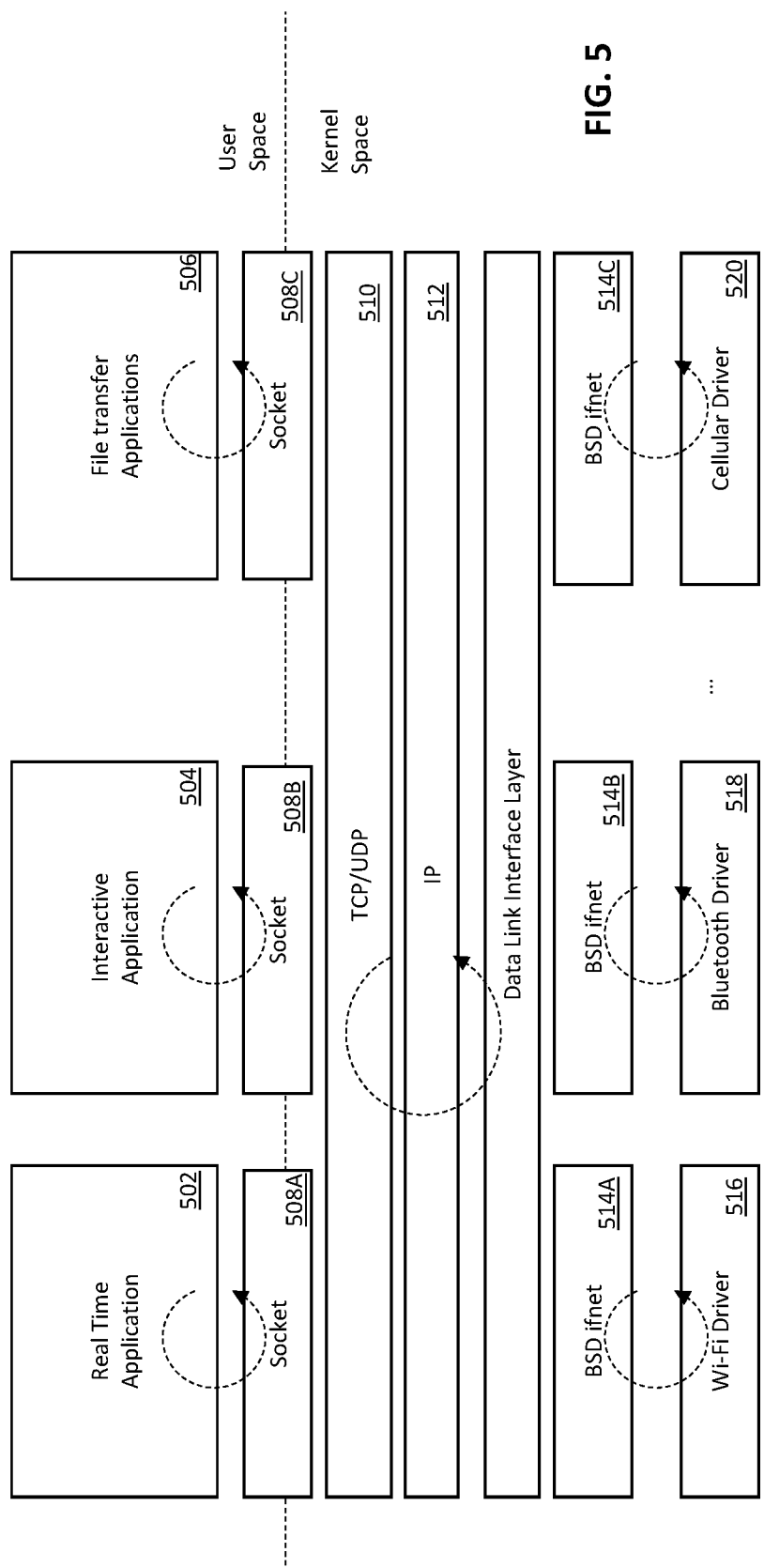
FIG. 5 is a block diagram of an exemplary implementation of application-based tuning, useful to explain various other workload optimization complexities of emerging use cases.

FIG. 5 illustrates a logical block diagram of an exemplary implementation of application-based tuning, useful to explain various other workload optimization complexities of emerging use cases.

As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for e.g., streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for e.g., human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute).

Similarly, within the communication arts, different communication technologies are associated with different capabilities and requirements. For example, Wi-Fi 516 (wireless local area networking based on IEEE 802.11) is heavily based on contention-based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mice). Cellular network technologies 520 often provide non-contention-based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multi-threaded operation. As shown therein, the exemplary multi-threaded operation incurs a number of server loops. Each server loop represents a logical break in the process during which the processor can context switch (see also aforementioned discussion of Existing Performance Optimization Technologies, and corresponding FIG. 2).

Moreover, in the computing arts, a "locking" synchronization mechanism is used by the kernel to enforce access limits (e.g., mutual exclusion) on resources in multi-threaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logistical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads will be deprioritized; currently, the traditional networking stack architecture is unable it clearly identify which threads can be deprioritized while still providing acceptable user service.

For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial.

Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the existing generic network sockets and generic network interfaces to a monolithic communications stack.

Exemplary User Space Networking Architecture

A networking stack architecture and technology that caters to the needs of non-kernel-based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters.

The user space networking stack architecture provides an efficient infrastructure to transfer data across domains (user space, non-kernel, and kernel). Unlike the traditional networking paradigm that hides the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike traditional networking stacks that use a "socket" based communication, disclosed embodiments can transfer data directly between the kernel and user space domains. Direct transfer reduces the per-byte and per-packet costs relative to socket-based communication. Additionally, direct transfer can improve observability and accountability with traffic monitoring.

Figure 6:
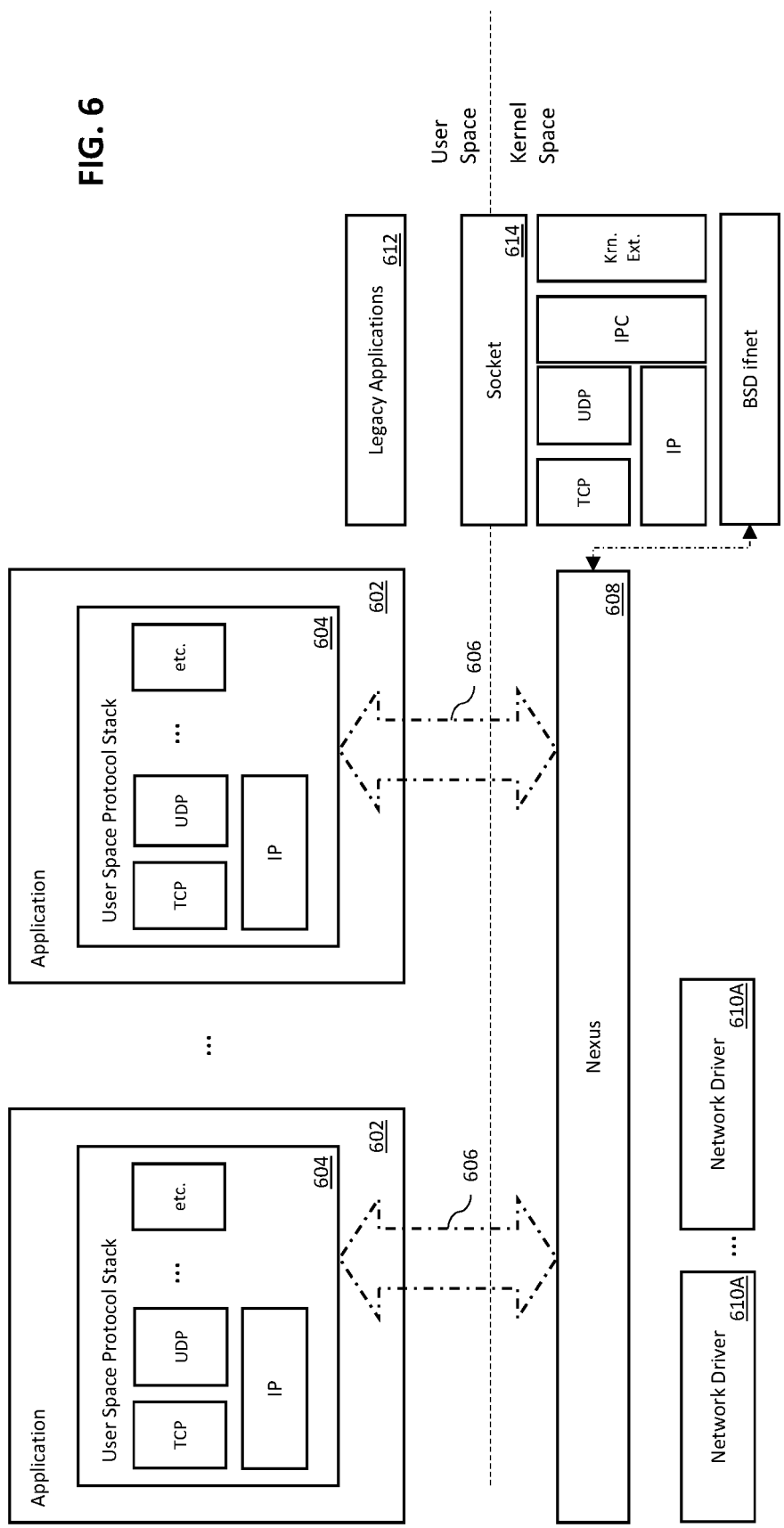
FIG. 6 illustrates one logical representation of an exemplary user space networking stack architecture, in accordance with the various aspects of the present disclosure.

FIG. 6 illustrates one logical representation of an exemplary user space networking stack architecture, in accordance with the various aspects of the present disclosure. While the system depicts a plurality of user space applications 602 and/or legacy applications 612, artisans of ordinary skill will readily appreciate given the contents of present disclosure that the disclosed embodiments may be used within single application systems with equivalent success.

As shown, a user space application 602 can initiate a network connection by instancing user space protocol stacks 604. Each user space protocol stacks includes network extensions for e.g., TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each nexus 608 manages access to the network drivers 610. Additionally, shown is legacy application 612 support via existing network socket technologies 614. While the illustrated embodiment shows nexus connections to both user space and in-kernel networking stacks, it is appreciated that the nexus may also enable e.g., non-kernel networking stacks (such as may be used by a daemon or other non-kernel, non-user process).

The following topical sections hereinafter describe the salient features of the various logical constructs in greater detail.

Exemplary User Space I/O Infrastructure

In one embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel-managed shared memory. During an access, the channel I/O is presented to the process (e.g., the user process or kernel process) as a file descriptor-based object, rather than as data. In order to access the data, the process de-references the file descriptor for direct access to the shared memory within kernel space. In one such implementation, the file descriptor-based object based I/O is compatible with existing operating system signaling and "eventing" (event notification/response) mechanisms. In one exemplary variant, the channel I/O is based on Inter Process Communication (IPC) packets.

As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security-based information (e.g., cyclic redundancy checks (CRC), parity, etc.).

In one embodiment, the channel I/O can be further leveraged to provide direct monitoring of its corresponding associated memory. More directly, unlike existing data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

In one embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology-based network drivers via channel I/O; in this manner, the user space networking stacks do not incur the traditional data mbuf based divide/copy/move penalties. Additionally, user space applications can directly access user space networking components for immediate traffic handling and processing.

Exemplary Nexus

In one embodiment, the networking stack connects to one or more nexus 608. In one such implementation, the nexus 608 is a kernel space process that arbitrates access to system resources including, without limitation e.g., shared memory within kernel space, network drivers, and/or other kernel or user processes. In one such variant, the nexus 608 aggregates one or more channels 606 together for access to the network drivers 610 and/or shared kernel space memory.

In one exemplary implementation, a nexus is a kernel process that determines the format and/or parameters of the data flowing through its connected channels. In some variants, the nexus may further perform ingress and/or egress filtering.

The nexus may use the determined format and/or parameter information to facilitate one-to-one and one-to-many topologies. For example, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the nexus may provide the format, parameter, and/or ingress egress information to kernel processes and/or one or more appropriately privileged user space processes.

In one embodiment, the nexus 608 may additionally ensure that there is fairness and/or appropriately prioritize each of its connected stacks. For example, within the context of FIG. 6, the nexus 608 balances the network priorities of both the existing user space application networking stacks 604, as well as providing fair access for legacy socket-based access 614. For example, as previously alluded to, existing networking stacks could starve user space applications because the kernel threads handling the legacy networking stack operated at higher priorities than user space applications. However, the exemplary nexus 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given nexus, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket-based access. For example, user application networking space may be more heavily weighted to improve overall performance or functionality, whereas legacy socket-based access may be preferred where legacy applications are preferentially supported.

Exemplary Network Extensions

In one embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent). In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the nexus (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

As used herein, an "instance" may refer to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

Exemplary User Space Networking Stack

Figure 7:
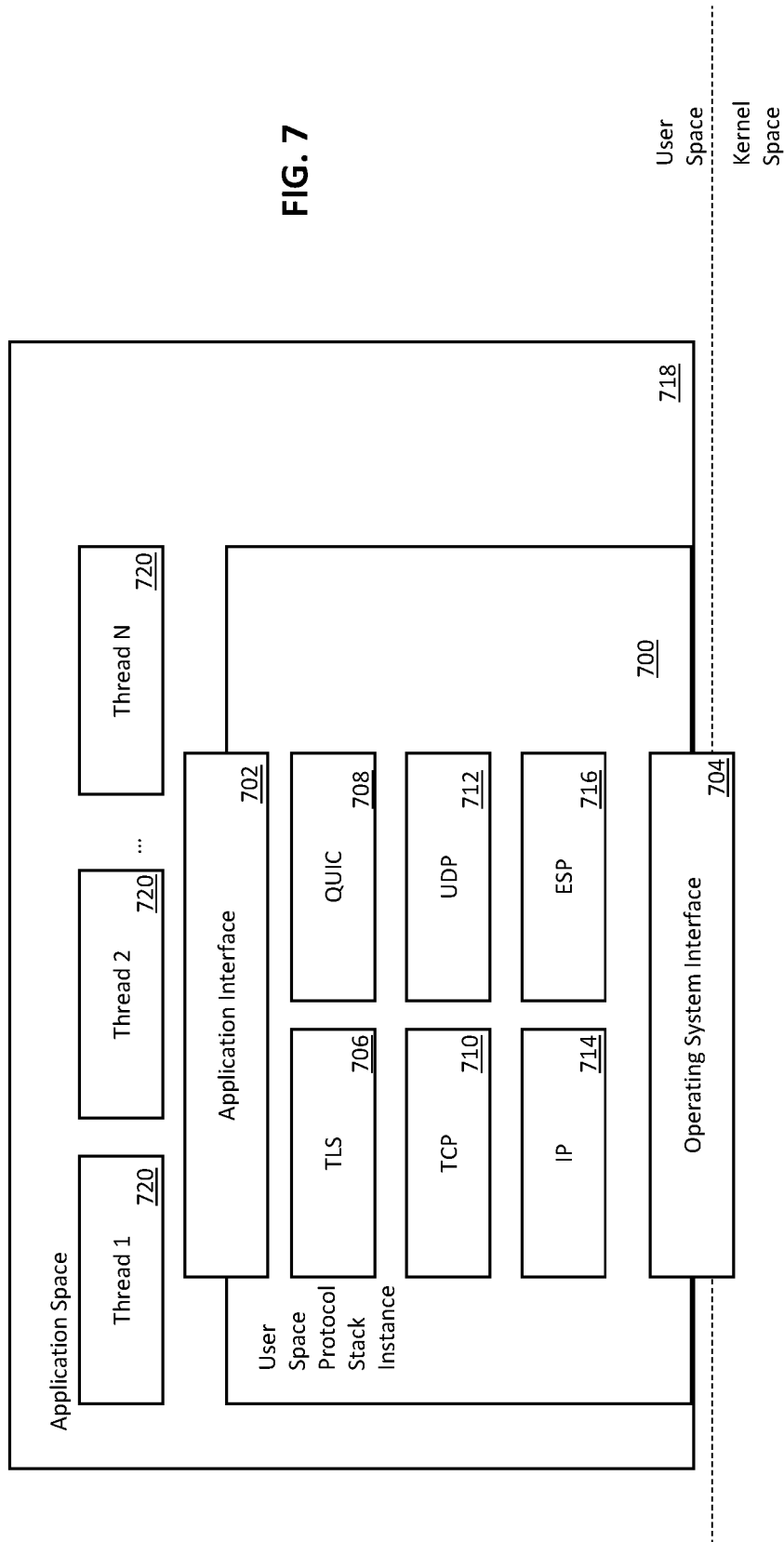
FIG. 7 is a block diagram of an exemplary user space networking stack, in accordance with the various aspects of the present disclosure.

Referring now to FIG. 7, one logical block diagram of an exemplary user space networking stack 700 is depicted. As shown, the user space networking stack 700 includes an application interface 702, and an operating system interface 704. Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared address space via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the in-kernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution. More directly, only one thread can access the user space networking stack 700 at a time; consequently, kernel locking is entirely obviated by the user space networking stack.

Another benefit of user space network stack operation is cross platform compatibility. For example, certain types of applications (e.g., iTunes®, Apple Music® developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., FaceTime® developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Non-Kernel Space Driver Enhancements

Certain aspects of device driver operation require special access; for example, device drivers often require direct read/write access to physical memory locations (as opposed to virtualized memory allocations). As but another example, device drivers may have latency and/or throughput requirements that are more stringent than user space processes. Historically, $3^{rd}$ party device drivers have been executed from kernel space consistent with heightened privileges and/or device access; however, this arrangement is dangerous.

As a brief aside, in order to facilitate integration, $3^{rd}$ party vendors often provide ready-to-use device drivers and/or firmware. Unfortunately, in some situations, vendors develop and release features without full verification. In other situations, the components and/or driver software may be used in a manner inconsistent with the vendor's intended use case and/or design assumptions. Malicious actors have learned to exploit and/or leverage $3^{rd}$ party device driver vulnerabilities in consumer electronics. Specifically, the aforementioned instability and/or vulnerability of $3^{rd}$ party drivers can be easily attacked; once compromised, the malicious actor has full access to the kernel via the $3^{rd}$ party driver's kernel access.

Within this context, solutions are needed to isolate driver extensions (dexts) from kernel space operations so as to minimize instability and/or vulnerability. Device drivers should be granted fewer privileges than kernel processes but must have acceptable real-time performance. To these ends, various aspects of the present disclosure are directed to providing non-kernel space access for driver operation. Specifically, device drivers may instantiate and use driver libraries that are specifically tailored for device driver considerations rather than e.g., re-using user space libraries that are designed for user space processes or granting overly inclusive kernel space privileges.

Figure 8:
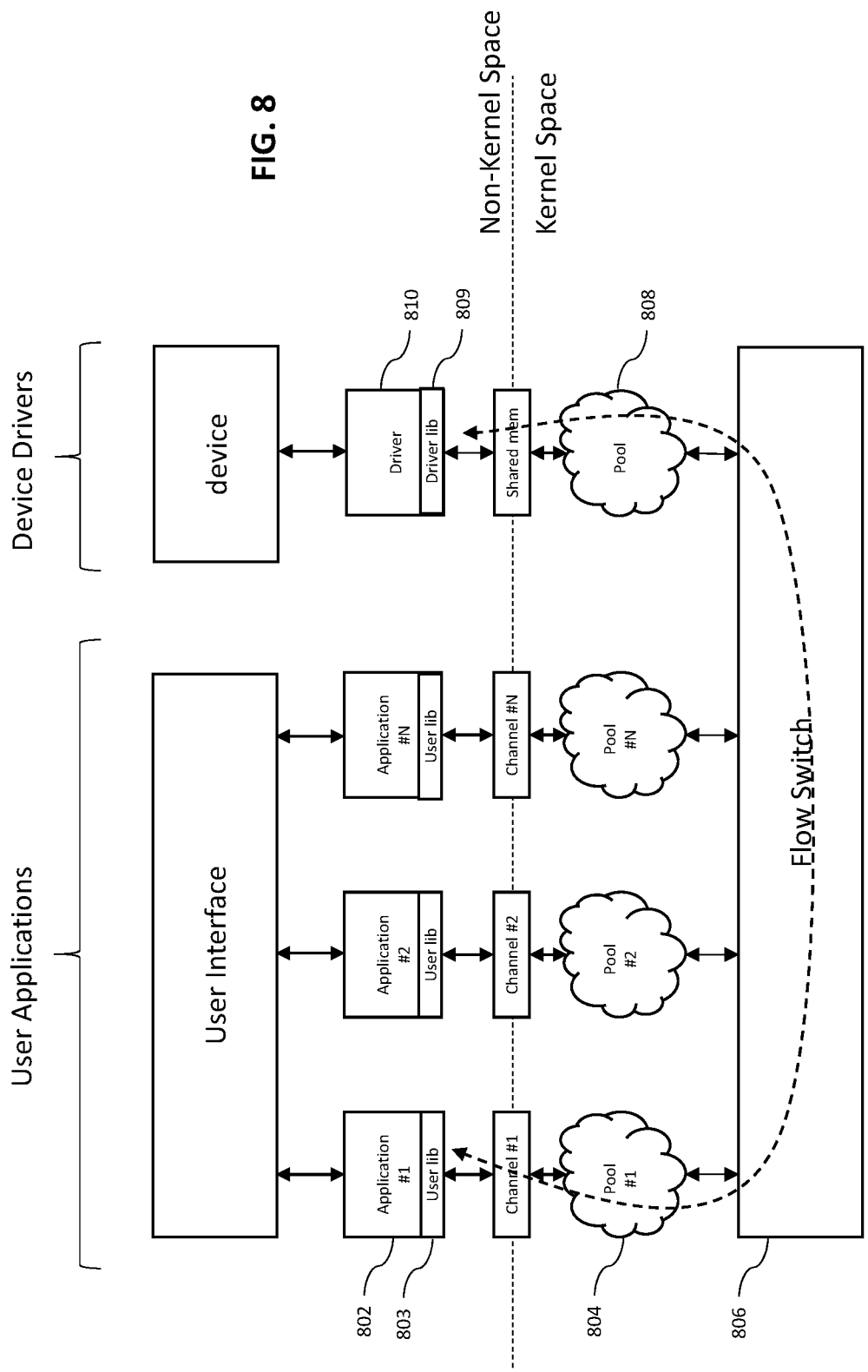
FIG. 8 is a block diagram of one exemplary networking architecture that supports both user space networking as well as non-kernel space processes (e.g., drivers), in accordance with the various aspects of the present disclosure.

FIG. 8 is a logical block diagram of one exemplary networking architecture that supports both user space networking as well as non-kernel space processes (e.g., drivers). As shown in FIG. 8, the exemplary networking architecture is split into kernel space and non-kernel space. The non-kernel space processes may include both user space processes and driver processes. During operation, one or more user space applications 802 generate and consume packet data from the user packet pool 804. The flow switch 806 routes packet data to/from the user packet pool 804 and driver packet pool 808. The device driver 810 is a non-kernel process that transacts packet data to/from the driver packet pool 808.

The exemplary networking architecture of FIG. 8 handles device drivers as non-kernel space processes. In other words, non-kernel space is allocated for application software and device drivers whereas kernel space is strictly reserved for running privileged operating system (O/S) processes. Just like user space processes, each device driver process runs in a specific memory allocation (a "sandbox") and cannot access the memory of other processes unless explicitly allowed. Notably, device drivers do not have kernel privileges; thus, compromised device drivers cannot affect kernel space.

As illustrated in FIG. 8, user space processes 802 may call a user space library 803 to interface to the flow switch 806 via a channel; in analogous manner, device driver processes 810 may call a driver library 809 to interface via a shared memory interface. Device drivers have different requirements from user space processes, and the differences in libraries 803, 809 reflects this functional difference. For example, while the exemplary user space networking architecture takes advantage of human perception for user space processing (e.g., human perception is much more forgiving than hardware operation), lenient timing generally cannot be afforded to hardware/firmware operation. In other words, even though device drivers should not be treated as kernel space processes for security reasons, they also should not be treated as user space processes for real-time reasons.

Various embodiments of the present disclosure contemplate device driver libraries that support driver specific requirements. For example, device driver operation may require zero-copy operations. So-called "zero-copy" operations refer to operations that can be performed without copying data from one memory area to another. Zero-copy operations save processor cycles and memory bandwidth. Additionally, some device drivers are embedded systems that tightly couple hardware and/or firmware. Tightly coupled hardware/firmware often assumes the continuous presence of physical memory i.e., memory must be persistently memory mapped (e.g., via an IOMMU described in greater detail infra) and cannot be dynamically wired/unwired in the same way that user space memory allocations may be. Still other embedded system considerations that are specific to device drivers would be readily appreciated by artisans of ordinary skill in the related arts, the foregoing being purely illustrative.

Figure 9:
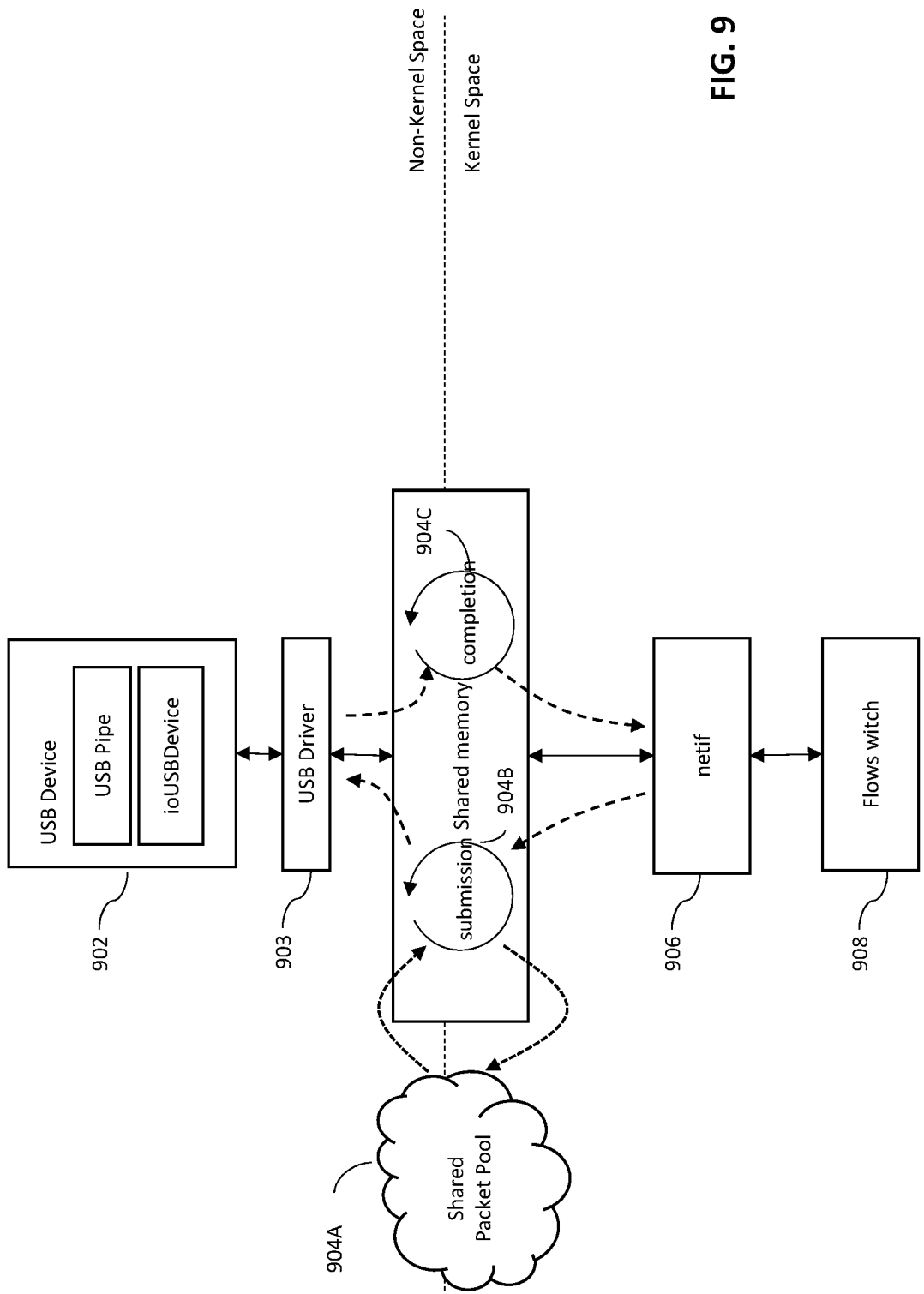
FIG. 9 is a block diagram of one exemplary shared memory interface for a non-kernel space driver in accordance with embodiments of the present disclosure.

FIG. 9 is a logical block diagram of one exemplary shared memory interface for a non-kernel space driver consistent with the various principles described herein. As shown therein, a 3$^{rd}$ party universal serial bus (USB) device 902 is accessible via a 3$^{rd}$ party provided USB driver 903. The USB driver 903 calls a driver library to instantiate a shared memory interface 904A, 904B, 904C. The shared memory interface 904A, 904B, 904C can be read/written to by the flow switch 908 via the network interface 906 operating from kernel space.

While the illustrated example is presented in the context of a 3$^{rd}$ party USB solution, artisans of ordinary skill in the related arts will readily appreciate that the mechanisms described herein may be applied to a variety of different device drivers. Other common examples of network interface technologies that are commonly found in consumer electronics devices include, without limitation e.g., IEEE 802.3 (Ethernet), IEEE 802.11 (Wi-Fi), Bluetooth, USB and its variants (USB 2.0, USB Superspeed, USB-C, etc.), Peripheral Connect Interface (PCI) and its variants (e.g., PCI-Express (PCIe)), High Definition Multimedia Interface (HDMI), DisplayPort, Thunderbolt, Lightning, etc.

In one embodiment, the driver library application programming interface (API) is parameterized so as to support a broad spectrum of technologies. For example, the device driver library exposes shared memory space for e.g., a packet pool 904A, submission queue 904B, and a completion queue 904C. The memory spaces are allocated from a shared memory space based on the instantiating driver's requirements (here, the memory sizes are set for USB bulk memory access). More generally, artisans of ordinary skill in the related arts will readily appreciate that most device drivers are heavily optimized for their technology specific operation. Each technology may require different timing, buffering, and/or operation from other technologies. As a practical matter, these differences may be reflected in ring segment sizes, the number of memory segments per ring, etc. For example, larger memory rings may enable higher throughput at higher latency, while smaller memory rings may provide lower throughput at lower latency, etc.

In the exemplary embodiment, the memory interface is a shared memory; i.e., the memory allocation can be read/written to by both kernel space and non-kernel space. In other embodiments, the memory interface may be read-only, read-write, and/or any other hybrid thereof. For example, some device drivers may have unidirectional pipes (e.g., one pipe is read-only by the transmitter, one pipe is read-only by the receiver, etc.)

Similarly, while the foregoing discussion is presented in the context of a ring data structure; artisans of ordinary skill in the related arts will readily appreciate that other data structures may be substituted with equal success. For example, other device drivers (such as PCIe) may use memory-mapped transfer descriptor ring (TDR) and/or completion descriptor ring (CDR) type interfaces.

Referring back to FIG. 9, one exemplary data transfer via the device driver operation is illustrated. During data transfer operations, the network interface writes data packets into a shared packet pool 904A. Pointers and/or indexes (or other referential data structures) to the packets are queued into the submission queue 904B. The USB driver 903 dereferences the pointers from the submission queue 904B and reads the data packets from the shared pool 904A. The data packets are delivered to the USB device 902. Subsequently thereafter, the USB driver 903 writes completion status into the completion ring 904C. The completed packets are returned to the network interface 906.

The foregoing example is presented in the context of the flow switch 908 providing packets to the USB device 902 (uplink), however the reverse direction (downlink) uses an analogous delivery mechanism. Specifically, the network interface allocates data packets for a read into a shared packet pool 904A. The USB driver 903 dereferences the pointers from the submission queue 904B and writes into the allocated data packets. Subsequently thereafter, the USB driver 903 writes completion status into the completion ring 904C. The completed packets are returned to the network interface 906 for reading.

As previously alluded to, the shared memory pool of FIG. 9 advantageously enables zero-copy operations. Specifically, the shared packet pool may be mapped with absolute addresses via the kernel space memory management unit (MMU); however, the driver's non-kernel space access uses relative addresses via an input/output MMU (IOMMU). More directly, the same packets are mapped in the kernel space via an absolute address, and in the driver's non-kernel space via a relative address.

The foregoing discussion presents various illustrative embodiments of the present disclosure, still other variations thereof may be substituted with equal success, by artisans of ordinary skill in the related arts given the contents of the present disclosure.

Figure 10A:
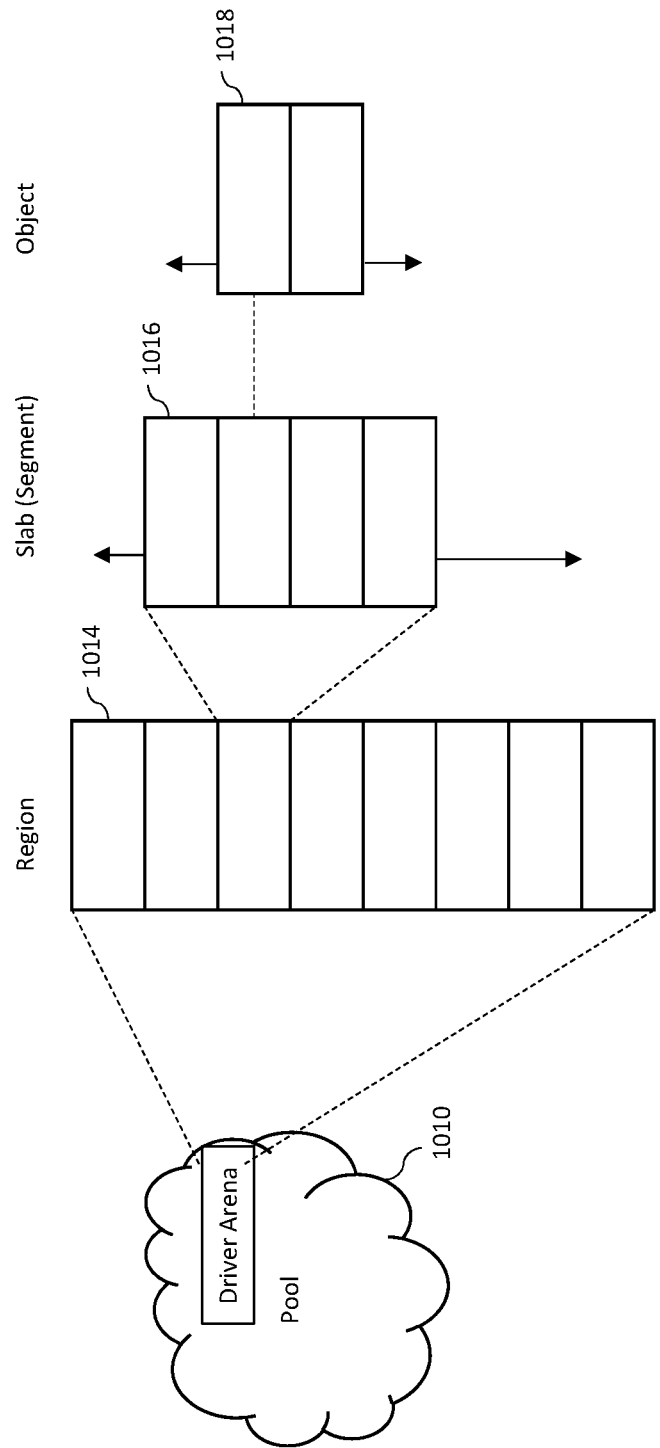
FIGS. 10A-10B are exemplary logical block diagrams for managing memory resources for use in accordance with embodiments of the present disclosure.
Figure 10B:
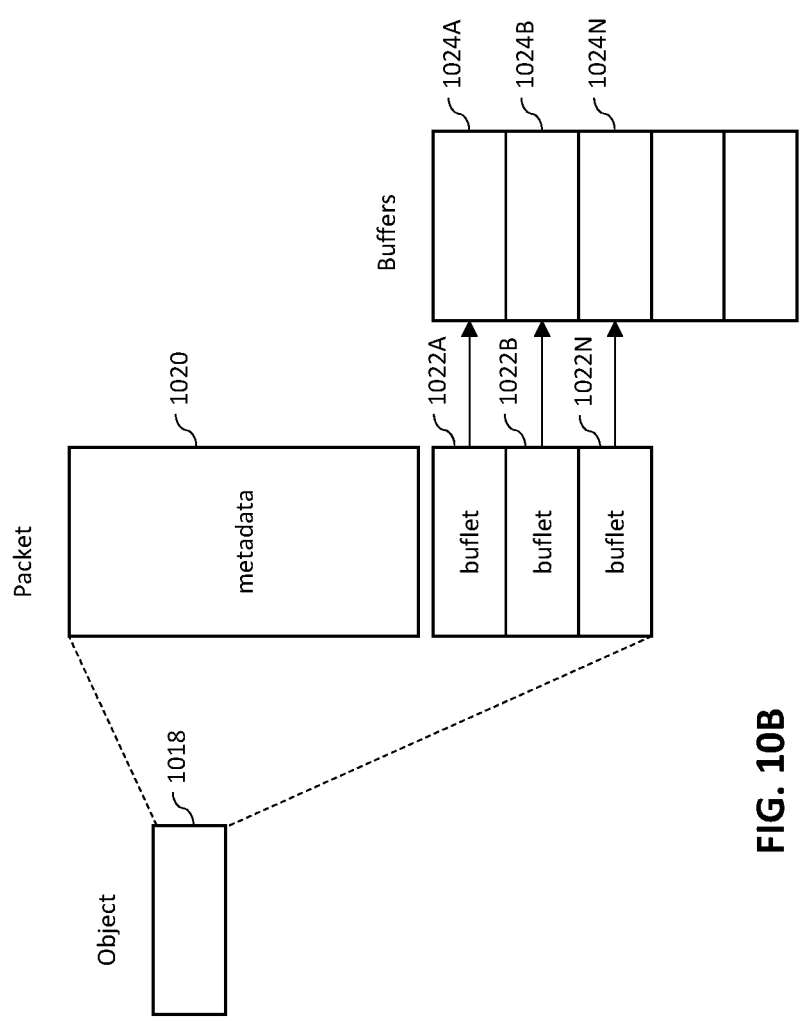

Referring now to FIGS. 10A-10B, one exemplary implementation for managing memory resources for use in accordance with embodiments of the present disclosure is now shown and described in detail. This exemplary system may be implemented through the use of a non-transitory computer-readable medium (e.g., a computer-readable apparatus) which may be embodied as software, hardware, or combinations of the foregoing. The non-transitory computer-readable medium may include one or more computer programs with computer-executable instructions, that when executed by, for example, one or more processing apparatus may implement one or more of the methodologies described subsequently herein.

Referring now to FIG. 10A, a driver pool 1010 may be composed of an arbitrary (or predetermined) number of region(s) 1014. Each region 1014 may further be composed of an arbitrary (or predetermined) number of "slabs" or "segments" 1016. Each slab or segment 1016 may further be dynamically (or statically) mapped to a corresponding I/O address via an Input/Output Memory Management Unit (IOMMU) or DMA Address Relocation Table (DART) aperture. Moreover, each slab or segment 1016 may be dynamically (or statically) sized to accommodate a set amount of data. For example, in some implementations, each slab or segment 1016 may be dynamically sized into multiples of page size (e.g., 4KB, 16KB, 32KB, etc.). Each slab or segment 1016 may further be subdivided into objects 1018 which may be established in accordance with its own dynamic (or static) sizing. For example, each object 1018 may consist of 2KB of data and may include, for example, packet metadata, buffers and/or other memory structures as is shown in, for example, FIG. 10B.

In one exemplary embodiment of the present disclosure, the driver library can parameterize the size of these regions, slabs and/or objects so as to most efficiently optimize the data transfers between, for example, a driver and a given application. As but one example, a USB device driver may have different sizing relative to e.g., PCIe device drivers, Wi-Fi drivers, Bluetooth drivers, etc. Moreover, the driver's sizing of regions, slabs and/or objects may also differ between respective applications in order to more efficiently handle these data transfers. For example, a USB Ethernet adapter driver may be configured differently in terms of latency, throughput, packet size, etc. depending on the ethernet medium connected to the adapter (e.g. 10MBase-T or 1GBase-T). Still other variations thereof may be substituted with equal success by artisans of ordinary skill in the related arts given the contents of the present disclosure.

FIG. 10B illustrates an exemplary data structure for a packet object 1018. Each packet object 1018 may further be composed of metadata 1020 as well as buflets 1022A, 1022B, ..., 1022N. The packet object metadata 1020 may be composed of descriptor data. As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information. Each packet object 1018 may further be composed of one or more buflets 1022A, 1022B, ..., 1022N. Each buflet 1022A, 1022B, ..., 1022N may point to a backing buffer 1024A, 1024B, ..., 1024N in memory. Each of these pointers may be individually purgeable, wired (i.e., guaranteed to be present), or unwired (i.e., okay to purge if necessary, but otherwise kept).

As used herein, "wired" memory refers to memory allocations that are backed by actual physical memory; in contrast, "unwired" or "purgeable" memory refers to memory allocations that may be either actually present or virtually present (virtually present memory can be recalled from a larger backing memory, with a page fault penalty). Notably, the mbufs for traditional in-kernel operation and driver I/O bounce buffers are wired memory; however, the memory allocations for channel I/O (e.g., buffers) disclosed in the various described embodiments are generally purgeable (with a few exceptions described in greater detail, infra). The ability to purge memory allocations for channel I/O can be used to facilitate memory reclamation.

The memory segments that contain the buffers 1024 pointed to by the buflets 1022 may be mapped to input/output (I/O) address space for direct memory access (DMA) operation, via the DART/IOMMU DMA mapping that occurs at the slab (segment) level. Each pool may solely be allocated to/requested by/managed by the aforementioned driver. The buffer or object 1018 sizes themselves may be individually determined (and controlled) by the aforementioned device driver allowing for customized usage cases that may be dependent upon, for example, the data sizes to be transmitted to/from the aforementioned driver. This dedicated mapping may also allow for direct memory mapped reads and/or writes without, for example, contention management and/or duplicate copies thereby enabling a so-called "zero-copy architecture" or reduced copy requirements.

For example, a device driver may require a pool of packet buffers (e.g., segment 1016) to support direct memory access (DMA) to buffered memory 1024. In order to support DMA within, for example, this shared purgeable memory; the driver may dynamically map segments 1016 into the Input/Output Memory Management Unit (IOMMU) or DMA Address Relocation Table (DART) aperture. In some variants, the pool of resources 1010 may be controlled by the driver (e.g., not by the user or kernel process). Various embodiments may further allow the pool 1010 to be exclusive to the driver or shared among several drivers. Read and write attributes may also be restricted on both the host and the device side based on the I/O direction.

More directly, a system global packet buffer pool is suboptimal in terms of resource allocation and does not offer the ability to deploy device/driver specific security policies. In contrast, a buffer pool that is individually controlled by a driver may also be jointly shared managed and owned among several drivers. The owner of the pool handles notifications to dynamically map and unmap the pool's memory segment from its device IOMMU aperture. This same notification may also wire/un-wire the memory as needed. Read and write attributes may also be restricted on both the host and the device side based on the I/O transfer direction for added security.

As a brief aside, a driver (or device driver) may be a computer program that operates or controls a particular type of device that is attached to (or part of) a computing system. In other words, a driver provides a software interface to hardware logic located within a computing system so as to enable, for example, an O/S or other computer program to access hardware functions for the hardware logic, without needing to know the underlying details about the hardware logic being used. Exemplary drivers may interface with, for example, video adapters (e.g., a graphics card), network adapters (e.g., Wi-Fi, Bluetooth®, or other networking modules), sound cards, local buses (e.g., an inter-processor communications bus), computer storage, etc.

The driver may further dedicate portions of its pool of resources to, for example, a given application. Within the one or more regions, the size of the slabs or segments may be dynamically chosen dependent upon the types (and sizes) of data transfers that would be expected within the given application. Moreover, the object size may also be dynamically chosen dependent upon the types (and sizes) of data transfers that would be expected within the given application. For example, an object may be sized to accommodate the types of metadata that would be typical for a given application as well as choosing the number of buflets within a given object. These and other variations would be readily apparent to one of ordinary skill given the contents of the present disclosure.

In some trusted applications, a given channel associated with an application may be directly mapped to a driver pool. For example, such a variant may be useful for first party applications. The established pool of resources may also limit access types for, for example, a given application. In other words, one established memory pool (or portion thereof) may be dedicated to write only memory accesses, while another established memory pool (or portion thereof) may be dedicated to read only memory accesses and vice versa. In some implementations, it may be desirable to limit a given application to write only (or read only) privileges for the established pool of memory resources. Such an implementation may be desirable dependent upon an application's requirements. For example, given an application that displays video received over, for example, a Wi-Fi connection, it may be desirable to establish two dedicated pools of resources, where one is only permitted read only privileges while the other is only permitted write only privileges.

In some implementations, one or more drivers may not use dynamic wiring and/or unwiring (e.g., may create a pool where each memory segment is permanently wired such that the driver has no need to use dynamic wiring and/or unwiring), while other drivers may use dynamic wiring and/or unwiring. For example, some drivers may always require access to wired memory. Some drivers may also require persistent I/O addressing. In other words, these drivers may not dynamically alter their IOMMU mappings. For example, a driver may request that a segment is non-dynamically mapped to a region. In some instances, a given pool of resources for a driver may be monolithic in nature. In other words, the given pool of resources may constitute a single region, and/or slab or segment. Such a variant may be useful in that such an implementation may reduce, for example, IOMMU address translation and reduce the complexity to manage multiple memory segments as well as the IOMMU mapping for each of those segments. These and other variants would be readily apparent to one of ordinary skill given the contents of the present disclosure.

Figure 11:
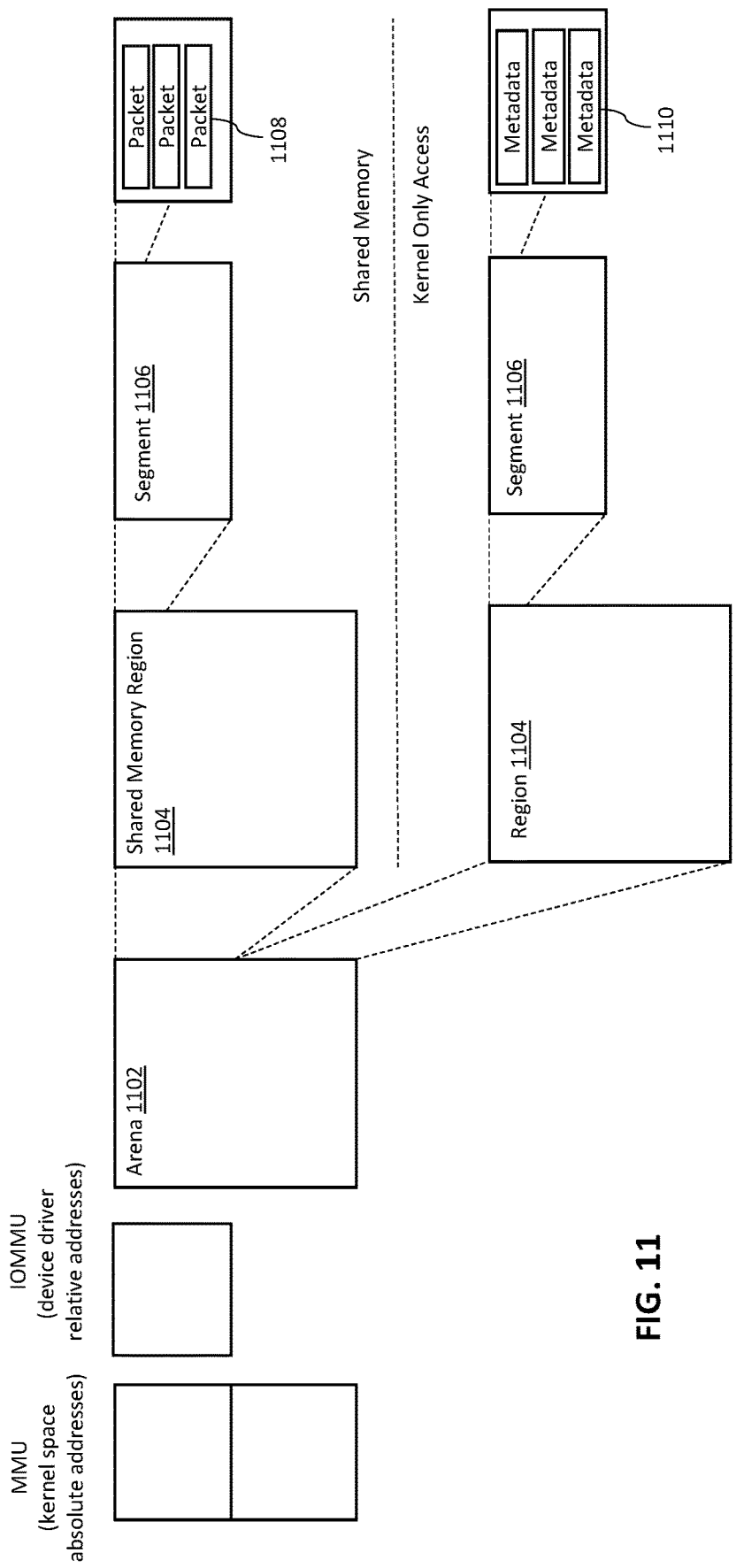
FIG. 11 is a graphical representation of the memory allocations for driver operation, in accordance with embodiments of the present disclosure.

FIG. 11 is a graphical representation of the memory allocations for driver operation. As shown therein, the kernel may allocate memory in kernel space to support a non-kernel space driver (absolute addresses within a memory management unit (MMU)). The total allocation is the driver's arena 1102. The non-kernel space driver does not have kernel privileges, and only receives limited access for mapping (relative addresses within an IOMMU).

In one exemplary embodiment, the non-kernel space driver may map all of its data structures to its shared memory region 1104. For example, the arena 1102 may have a shared memory 1104 that is further split into segments 1106 and objects 1108. In one exemplary embodiment, the memory allocation is further mirrored with kernel-only memory allocations. Thus, the channel allocation has two components, the shared memory region, and the kernel accessible region.

In one variant, each region (the shared memory region and the kernel accessible region) is defined with different properties. Each region is specific for different uses and has different sizes, uses, permissions, etc. The device accessible region is provided in the IOMMU to the device driver. Although the kernel accessible region is still reserved for the driver, the kernel accessible region is not IOMMU mapped and hence, the device cannot read/write to these memory allocations.

Methods

As previously noted, device drivers have been historically handled as kernel space processes since their hardware-centric nature usually requires direct access to physical memory, logic, and/or components. However, device driver operation is only a small portion of the overall kernel's tasks; granting device drivers overinclusive access to all of the kernel space is undesirable for a variety of reasons (e.g., security, etc.) The illustrative examples described herein exclude device driver operation from kernel space, while still providing necessary access to hardware. More generally, the principles described herein provide limited access to hardware for non-kernel entities.

Figures 12A, 12B:
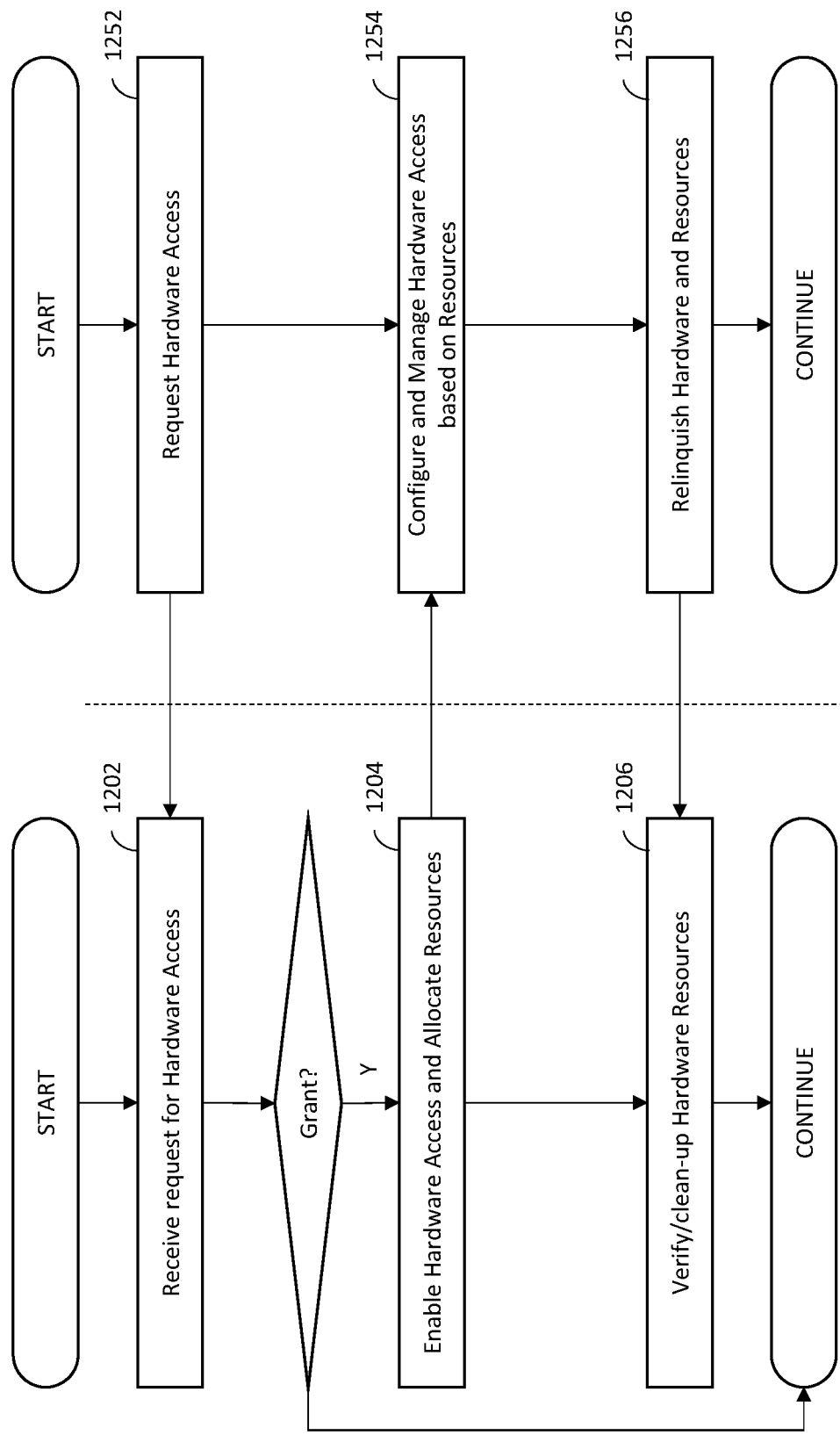
FIGS. 12A-12B are exemplary logical flow diagrams for handling hardware operations within non-kernel space, in accordance with embodiments of the present disclosure.

FIG. 12A is a logical flow diagram of an exemplary method 1200 for enabling hardware operations within non-kernel space, in accordance with the various principles described herein.

At step 1202 of the method 1200, a kernel space entity receives a request for hardware access from a non-kernel space entity. In one exemplary embodiment, a device driver application calls a device driver library that provides device driver extensions (dext). The device driver library provides application programming interface (API) calls that can be used by device drivers to request privileged access (e.g., kernel-like access) with limitation.

In some embodiments, the request may be received from a device-specific driver that is associated with a specific hardware component. Device-specific drivers are designed for, and tightly coupled to, their hardware components. In other embodiments, generic device drivers may request hardware access according to e.g., predefined protocols and/or standards promulgated by trade industries. Generic device drivers are commonly used in commodity peripherals (e.g., mice, keyboards, headphones, speakers, printers, video adaptors, network cards, sound cards, image scanners, digital cameras, etc.)

While the foregoing discussion is presented in the context of device driver library calls that are initiated by a device driver application, other scenarios may be substituted with equal success. For example, an external entity may remotely execute a device driver (e.g., remote activation, pushed updates). In other examples, the kernel itself may identify applications that would benefit from driver-like treatment; for example, a user space application may benefit from wired memory (memory that is persistent and cannot be virtualized). In still other implementations, a user space process may use kernel extension (kext) functionality that requires hardware control; for example, certain applications may benefit from dedicated processing, task prioritization, and/or special power management.

As previously alluded to, access to hardware is potentially exploitable. Isolating the non-kernel entity from kernel space operation provides significant security benefits in terms of system integrity, however additional peripheral protections may also be required. For example, non-kernel space control of hardware may result in power consumption and processing/memory use that differs from normal activity; even though data security is not jeopardized, this may result in other undesirable behavior (e.g., running battery life down, wasting processor cycles, memory starvation, etc.) Consequently, certain embodiments may require that the requesting entity pass security countermeasures including e.g., verified identification, authorization, and/or authentication. Security countermeasures ensure that hardware access is limited to legitimate use. In some cases, security may be performed locally between the kernel and the requesting application. In other cases, authentication and/or authorization may be based on an externally trusted $3^{rd}$ party (e.g., based on an external permissions service).

In some cases, requests may include resource requests and/or required operational parameters. For example, device-specific drivers often leverage implementation specific knowledge to control device functionality. Additionally, legacy device-specific drivers may be designed for, and assume, kernel space execution (e.g., the highest level of privilege, limited context switching, etc.) Consequently, device drivers may need to provide, identify, or otherwise make known their required or highly recommended operational parameters and/or requirements. For instance, a device-specific driver may use the driver extensions to set: a minimum memory allocation, access protections (e.g., read-only, read-write, write-only, etc.), process preemption treatment, and/or other operational restrictions. In other cases, requests may reference a particular version and/or revision of a generic protocol to identify its required allocations. For example, a generic USB device driver may comply with a certain version or revision of standards that are published by the USB Implementer's Forum (e.g., a trade association for USB manufacturers). In still other cases, the kernel space entity may proactively suggest or assume a generic driver until notified otherwise; for example, the kernel entity may treat all USB storage devices as generic USB storage.

Referring back to the method 1200 of FIG. 12A, hardware access and/or corresponding resources may be allocated when the request is granted (step 1204), otherwise the method 1200 ends. In alternative implementations, the method 1200 may postpone the grant and/or allow the requesting application to re-request at a later time, or with different parameters.

As a brief aside, the kernel space manages hardware resources for non-kernel space applications e.g., driver applications, user space applications, remote applications, etc. For example, the kernel space entity manages a memory map that identifies how data structures are organized. Examples of resources that may be managed by the kernel include without limitation processing resources, memory resources, power management, etc. For instance, the kernel may need to ensure that tasks complete at specific times, or that interrupts are handled in a timely matter. As but another example, the kernel may power-up or power-down portions of the system based on a default power management scheme. Various embodiments of the present disclosure expose hardware access and kernel-like functionality to non-kernel entities (e.g., device drivers).

In one exemplary embodiment, a device driver process runs in a specific memory allocation (a "sandbox") that cannot access the memory of other processes unless explicitly allowed. Even though the device driver does not have kernel privileges, the device driver may be granted access to hardware and/or resources within the confines of its sandbox. In one embodiment, the granted access may exceed privileges and/or capabilities that are provided to other non-privileged applications. For example, a memory management unit (MMU) may allocate a portion of its managed memory to a device driver for input and output; the device driver can access the memory via an input/output memory management unit (IOMMU). In one such implementation, the granted IOMMU access may provide direct memory access via a "wired" memory allocation that persists throughout use. Notably, the memory allocation is jointly controlled (subject to access restrictions) by both the MMU and the IOMMU. Other examples of privileged memory access may include e.g., zero-copy access (e.g., operations that can be performed without copying data from one memory area to another), enhanced privileges (entitlements, etc.), and/or visibility into any specialized data structures (e.g., ring access, device address resolution tables (DARTs), and/or any other addressing modes, etc.).

Processing and/or power management variants may provide analogous kernel-like control over system resources to non-kernel entities. For example, a non-kernel entity may be granted scheduling control for a processing core and/or power management control over an external interface subsystem. More generally, virtually hardware access and/or control over any other physical component of the computer system may be substituted with equal success by artisans of ordinary skill in the related arts, given the contents of the present disclosure.

In one embodiment, the grant may impose limitations on the non-kernel entity's access. In one exemplary embodiment, the access is limited to the granted hardware. For instance, the non-kernel entity may only have unfettered access to its IOMMU memory allocation; memory accesses outside of the IOMMU must be performed using existing memory access techniques (e.g., virtual memory addressing which may be purgeable, etc.) Still other limitations may be substituted with equal success; examples of such limitations include e.g., time, access type, privilege, functionality, and/or usage. For example, scheduling for a processor may be limited to a certain window of time or resources (e.g., time slots). Similarly, power management control may be limited to a portion of the device (only an external interface) or certain sleep modes (e.g., a driver may avoid low power mode, but cannot override deep sleep, etc.).

Notably, multiple non-kernel entities may contend for the same physical components of a computer system. Thus, the kernel space entity may need to decide whether or not to grant hardware access and/or which non-kernel entities may need to be prioritized. For instance, two conflicting requests could be mutually exclusive e.g., a request for a network port may block other requests. In other examples, conflicting requests may require balancing or division; e.g., memory grants may split a physical memory. Still other variants may handle conflicts in sequence e.g., a processor core may be granted to a first non-kernel entity process until terminated, and thereafter the core is granted to another process.

More generally, requests may be granted in a variety of different ways. The kernel space entity may consider holistic operational considerations in determining how to manage resource conflict (e.g., overall processing and/or memory burden, user experience considerations, etc.) Still other techniques may be readily substituted by artisans of ordinary skill in the related arts, given the contents of the present disclosure.

In some implementations, a request that is denied may include denial information; this may enable the requesting process to recover/re-request. For example, a device-specific driver may be unable to access a hardware component that is already controlled by a generic device driver. The user may be flagged to disable the generic device driver so as to enable the device-specific driver features. In other cases, a request that is denied may not provide any reason for denial. This may be particularly useful to prevent malicious activity and/or abuse. Still other techniques for requesting and/or granting hardware access may be substituted with equal success by artisans of ordinary skill in the related arts, given the contents of the present disclosure. Examples of such schemes may include without limitation, limited or conditional grant/denial, grant/denial based on historic benefits or abuse, fixed use or semi-fixed use, etc.

When the non-kernel entity relinquishes control of the hardware and corresponding resources (if any), then the kernel space entity can verify/clean-up the hardware and resources at step 1206 of the method 1200. Consider a USB driver that corrupts its memory allocation due to unexpected operation or instability. The kernel may be able to recover some packet data based on e.g., valid CRCs. Malformed data packets (e.g., invalid CRCs) can be discarded. The entire memory allocation can be cleared of data and returned to the system for other purposes. In this manner, the kernel can terminate and clean-up the driver's resource allocations without adverse effect even under worst-case scenarios.

As illustrated supra, the exemplary user space networking architectures described herein enables new techniques not previously possible. Notably, the controlled access to hardware described herein enables stable return of system resources and/or recovery of data. More directly, the non-kernel entity can only affect its granted resources in accordance with the prescribed limitations. For example, a driver application can intentionally self-terminate and restart; in some cases, this may provide a graceful reset heretofore not possible. More generally however, the principles described herein are broadly applicable to any non-kernel space application that benefits from stable kernel-like access.

FIG. 12B is a logical flow diagram of an exemplary method 1250 for requesting access to hardware operations, in accordance with the various principles described herein.

At step 1252 of the method 1250, the non-kernel entity requests hardware access. In one exemplary embodiment, a device driver calls a device driver library. In other embodiments, the request may be generated by a non-kernel space application (e.g., a user application, daemon process, etc.) While the foregoing discussion is presented in the context of internal device operation (kernel and driver), the various techniques described herein may be broadly applied to any logical entity that benefits from kernel-like access.

In some embodiments, the non-kernel entity generates a request for hardware access subject to kernel restrictions. In one exemplary embodiment, a device driver may make API calls that identify resource requirements and/or operational parameters. Examples of resource requirements may include e.g., memory size, dedicated bandwidth, power subsystems and/or any other physical resource. Examples of operational parameters may include e.g., timing constraints, minimum or maximum latency, minimum or maximum throughput, clock rate, access privileges, scheduling requirements, priority, and/or any other kernel space treatment.

In some cases, the request may be performed based on kernel information. For example, the kernel may notify a device driver of the presence of a potentially compatible device. If the device is supported, then the device driver may identify the specific resources and/or operational parameters that are necessary for the identified device.

Additionally, since the non-kernel entity is not provided full kernel space access, it cannot exceed the bounds of its request (e.g., underestimating its resource requirements is counterproductive); moreover, requests may be prioritized/de-prioritized based on resource utilization, overestimating resource requirements may be detrimental. Thus, in some cases, the kernel may provide system information to a device driver to facilitate the request/grant process. The system information may include notifications of resource shortages, other activity, and/or other system considerations. Depending on system information, the device driver may specifically tailor its resource requests to optimize its performance in view of overall system considerations. For instance, a device driver may select a high-performance mode when unconstrained, and an economy mode when there are memory shortages, power constraints, etc.

At step 1254 of the method 1250, the non-kernel entity configures hardware access based on the granted resource allocations. As previously alluded to, existing networking architectures rely on principles of modular design and abstraction; thus, under normal operation non-kernel space entities are shielded from resource management considerations (e.g., memory sizing, task scheduling, power management, etc.) In contrast, the exemplary non-kernel entities of the present disclosure are granted kernel-like capabilities to manage their resource allocations.

In one embodiment, a device driver library may enable resource management in accordance with device considerations. In one exemplary embodiment, the driver library parameterizes the size of its memory regions, slabs and/or objects; device drivers can use the driver library to efficiently optimize data transfers. In some variants, the sizing may be optimized based on network operation (e.g., based on packet size, latency, throughput, and/or other network transmission considerations). In other variants, the sizing may be optimized for internal considerations; e.g., memory access, internal flow switch routing, processing considerations, etc. For example, a driver may allocate a fixed portion of its allocation to a specific application; in some cases, such allocations may be further optimized for application specific considerations by the driver. Other examples of memory-based configuration may include without limitation: wiring/unwiring memory, read/write attributes, zero-copy treatment, etc.

While the present disclosure is presented in the context of joint resource management between kernel and non-kernel space entities, artisans of ordinary skill in the related arts will readily appreciate that the principles may be extended to share control between non-kernel space entities. For example, due to the similarity in operating conditions, Wi-Fi and Bluetooth systems are often bundled together within the same component. In one exemplary implementation, device drivers for both Wi-Fi and Bluetooth may jointly manage and share the same memory allocation. During operation, the device drivers transfer ownership of the shared memory allocation by mapping and unmapping IOMMUs and/or wiring/unwiring memory.

More generally, artisans of ordinary skill in the related arts, given the contents of the present disclosure, will readily appreciate that an appropriately enabled non-kernel entity may use kernel-like capabilities to tailor its resource allocations for a variety of considerations. For example, a non-kernel entity that has task scheduling capabilities can prioritize task execution according to its own considerations. Similarly, a non-kernel entity that has power management capabilities can define power management schemes that differ from the default system management.

When the non-kernel space entity finishes its operation or when the non-kernel space entity terminates, the intermediary access and corresponding intermediary resources are closed or otherwise relinquished (step 1256 of the method 1250). In the illustrated embodiment, the hardware access and/or resources may be explicitly released by the non-kernel space entity when the non-kernel space entity has ended; in some cases, the hardware access and/or resources may also be implicitly cleared by the kernel when the non-kernel space entity ends or is terminated.

In some embodiments, the hardware access and/or resources may be allowed to persist even after the original requesting non-kernel space entity has ended. For example, resource allocation that was originally allocated for a Wi-Fi driver and subsequently co-owned by a Bluetooth driver may be allowed to persist after the Wi-Fi driver lapses. More generally, persistent resource allocations may be helpful where an entity other than the requesting process (e.g., the kernel, user space application, background daemon, etc.) continue to use the same resource allocations. In some such implementations, the hardware access and/or resources may be associated with a lifetime. When the grant expires, the or resources may be re-requested and granted, renewed, or otherwise extended. In some implementations, the resources may be associated with a number of applications; so long as at least one of the applications is active, the resources may remain active. Still other techniques may simply allow the resources to persist until a conflict arises; if necessary, the stale resources can be re-assigned, etc.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A computerized apparatus, comprising:
   a network interface configured to communicate with a network;
   wherein the network interface comprises a shared memory buffer that is capable of being accessed by a kernel space and a non-kernel space;
   digital processor apparatus; and
   storage apparatus comprising a storage medium having one or more computer programs stored thereon, the one or more computer programs configured to, when executed by the digital processor apparatus, cause the computerized apparatus to:
     receive a request to enable the network interface for privileged access to a specific memory allocation of the shared memory buffer from a non-kernel space application;
     determine whether to grant the request;
     when the determination indicates that the request should be granted, enable the privileged access to the network interface and allocate the specific memory allocation of the shared memory buffer to the non-kernel space application; and
     when relinquished, disable the privileged access to the network interface and deallocate the specific memory allocation of the shared memory buffer from the non-kernel space application.

2. The computerized apparatus of claim 1, wherein the kernel space is capable of accessing the shared memory buffer via absolute addressing within a memory management unit (MMU).

3. The computerized apparatus of claim 2, wherein the non-kernel space application is capable of accessing the shared memory buffer via relative addressing within an input/output memory management unit (IOMMU).

4. The computerized apparatus of claim 3, wherein the non-kernel space application cannot access a memory allocation associated with at least one other non-kernel space application.

5. The computerized apparatus of claim 3, wherein the non-kernel space application splits the shared memory buffer into data structures based on an operational parameter of the network.

6. The computerized apparatus of claim 1, wherein the non-kernel space application comprises a device driver that is specific to the network interface.

7. The computerized apparatus of claim 1, wherein the access comprises zero-copy access.

8. A computerized apparatus, comprising:
   a shared memory buffer that is capable of being accessed by a kernel space and a non-kernel space;
   digital processor apparatus; and
   storage apparatus comprising a storage medium having one or more computer programs stored thereon, the one or more computer programs configured to, when executed by the digital processor apparatus, cause the computerized apparatus to:
     request privileged access to a specific memory allocation of the shared memory buffer for a non-kernel space application;
     configure the shared memory buffer based on the specific memory allocation that was granted to the non-kernel space application; and relinquish the shared memory buffer and the specific memory allocation when the non-kernel space application terminates.

9. The computerized apparatus of claim 8, wherein the non-kernel space application comprises a network interface specific device driver.

10. The computerized apparatus of claim 8, wherein the shared memory buffer is mapped to an input/output memory management unit (IOMMU) controlled by the non-kernel space application.

11. The computerized apparatus of claim 10, wherein the shared memory buffer is mapped to a memory management unit (MMU) controlled by a kernel space application.

12. The computerized apparatus of claim 8, further comprising a processor core.

13. The computerized apparatus of claim 8, further comprising a power management subsystem.

14. A method for handling hardware operations within a non-kernel space, the method comprising:
requesting privileged access to a shared memory buffer for a non-kernel space application; and
configuring the shared memory buffer based on a resource allocation associated with the non-kernel space application;
wherein a kernel space application and the non-kernel space application jointly access the shared memory buffer; and
wherein the non-kernel space application cannot access at least one other kernel space resource in the shared memory buffer that is allocated to at least one other kernel space application.

15. The method of claim 14, wherein the resource allocation comprises an input/output memory management unit (IOMMU) allocated to the non-kernel space application.

16. The method of claim 15, wherein the configuring comprises mapping the shared memory buffer to the IOMMU.

17. The method of claim 16, wherein the shared memory buffer is mapped within a memory management unit (MMU) of the kernel space application.

18. The method of claim 14, wherein configuring the shared memory buffer is further based at least in part on a network protocol.

19. The method of claim 14, wherein the resource allocation is shared by multiple non-kernel entities.

20. The method of claim 14, wherein the non-kernel space application is a device driver application, and
wherein the method further comprises transacting data for a user space application using at least the device driver application.

* * * * *

UNITED STATES PATENT AND TRADEMARK OFFICE
CERTIFICATE OF CORRECTION

PATENT NO. : 11,829,303 B2
APPLICATION NO. : 16/936143
DATED : November 28, 2023
INVENTOR(S) : Masputra et al.

It is certified that error appears in the above-identified patent and that said Letters Patent is hereby corrected as shown below:

In the Specification

In Column 1, Line 27, delete "14/236,032" and insert -- 16/236,032 --, therefor.

In Column 1, Line 33, delete "14/368,396" and insert -- 16/368,396 --, therefor.

In Column 1, Line 39, delete "14/368,338" and insert -- 16/368,338 --, therefor.

Signed and Sealed this
Thirteenth Day of February, 2024

Katherine Kelly Vidal
*Director of the United States Patent and Trademark Office*